(12) United States Patent
Rath et al.

(10) Patent No.: US 11,512,629 B2
(45) Date of Patent: Nov. 29, 2022

(54) ADJUSTABLE-LENGTH CONNECTING ROD, RECIPROCATING PISTON ENGINE, AND VEHICLE

(71) Applicants: AVL LIST GMBH, Graz (AT); IWIS MOTORSYSTEME GMBH & CO. KG, Munich (DE)

(72) Inventors: Martin Rath, Graz (AT); Siegfried Lösch, Graz (AT); Christian Gallob, Judenburg (AT); Klaus Landfahrer, Graz (AT)

(73) Assignees: iwis motorsysteme GmbH & Co. KG, Munich (DE); AVL List GmbH, Graz (AT)

( * ) Notice: Subject to any disclaimer, the term of this patent is extended or adjusted under 35 U.S.C. 154(b) by 0 days.

(21) Appl. No.: 17/053,704

(22) PCT Filed: May 8, 2019

(86) PCT No.: PCT/AT2019/060156
§ 371 (c)(1),
(2) Date: Feb. 16, 2021

(87) PCT Pub. No.: WO2019/213683
PCT Pub. Date: Nov. 14, 2019

(65) Prior Publication Data
US 2021/0164390 A1 Jun. 3, 2021

(30) Foreign Application Priority Data

May 8, 2018 (AT) .............................. A 50382/2018
Oct. 8, 2018 (AT) .............................. A 50877/2018

(51) Int. Cl.
*F02B 75/04* (2006.01)
*F16C 7/06* (2006.01)
*F16K 15/04* (2006.01)

(52) U.S. Cl.
CPC .............. *F02B 75/045* (2013.01); *F16C 7/06* (2013.01); *F16C 2360/22* (2013.01); *F16K 15/044* (2013.01)

(58) Field of Classification Search
CPC combination set(s) only.
See application file for complete search history.

(56) References Cited

U.S. PATENT DOCUMENTS 2,681,644 A * 6/1954 Purchas, Jr. ............ F01L 1/245
123/90.55
2007/0175422 A1 8/2007 Takahashi et al.
(Continued)

FOREIGN PATENT DOCUMENTS

AT 15006 10/2016
AT 517217 12/2016
(Continued)

OTHER PUBLICATIONS

WO2016203047A1—English translation.*
(Continued)

*Primary Examiner* — George C Jin
*Assistant Examiner* — Teuta B Holbrook
(74) *Attorney, Agent, or Firm* — Sheirdan Ross P.C.

(57) ABSTRACT

The invention relates to an adjustable-length connecting rod for a reciprocating piston engine, to a reciprocating piston engine, and to a vehicle, where an effective connecting rod length of the connecting rod can be changed, and the connecting rod has a hydraulic length adjustment device which has a hydraulic working chamber, a hydraulic duct, a valve recess with a valve recess longitudinal axis, and a valve device which is arranged in the valve recess and has a valve chamber, where the valve device is configured for opening and/or shutting of a hydraulic medium outflow from the hydraulic working chamber, and the hydraulic duct (Continued)

opens into the valve recess at an orifice opening in an inner wall section of the valve recess. The valve device has at least one closed outer wall section which lies opposite the orifice opening and surrounds the valve chamber of the valve device, where the outer wall section of closed configuration of the valve device configures a flow duct together with that inner wall section of the valve recess, where the flow duct is configured to divert hydraulic medium, which exits from the hydraulic duct with a first flow direction and enters into the valve recess, in a second flow direction which is different from the first flow direction before the entry into the valve chamber.

20 Claims, 10 Drawing Sheets

(56) References Cited

U.S. PATENT DOCUMENTS

2018/0371987 A1* 12/2018 Mudra ................ F16K 31/363
2018/0371988 A1* 12/2018 Melde-Tuczai ........... F16C 7/06

FOREIGN PATENT DOCUMENTS

| AT | 518563 A1 * | 11/2017 | |
|----|----|----|----|
| AT | 519932 | 11/2018 | |
| DE | 102012020999 | 1/2014 | |
| DE | 102015202056 | 8/2016 | |
| DE | 102017217474 | 4/2018 | |
| EP | 3219954 B1 * | 6/2018 | ................ F16C 7/06 |
| WO | WO 2016/064193 | 4/2016 | |
| WO | WO 2016/203047 | 12/2016 | |
| WO | WO-2016203047 A1 * | 12/2016 | ............ F02B 75/045 |

OTHER PUBLICATIONS

International Search Report and Written Opinion for International (PCT) Patent Application No. PCT/AT2019/060156, dated Jul. 7, 2019, 9 pages.

English Translation of the International Search Report for International (PCT) Patent Application No. PCT/AT2019/060156, dated Jul. 7, 2019, 2 pages.

Official Action for Austria Patent Application No. A 50382/2018, dated Nov. 8, 2018, 3 pages.

Official Action for Austria Patent Application No. A 50877/2018, dated Feb. 21, 2019, 3 pages.

* cited by examiner

ADJUSTABLE-LENGTH CONNECTING ROD, RECIPROCATING PISTON ENGINE, AND VEHICLE

CROSS REFERENCE TO RELATED APPLICATIONS

This application is a national stage application under 35 U.S.C. 371 and claims the benefit of PCT Application No. PCT/AT2019/060156 having an international filing date of 8 May 2019, which designated the United States, which PCT application claimed the benefit of Austria Patent Application No. A50382/2018 filed 8 May 2018, and Austria Patent Application No. A50877/2018 filed 8 Oct. 2018, the disclosures of each of which are incorporated herein by reference in their entireties.

The present invention relates to an adjustable-length connecting rod for a reciprocating piston engine, particularly for a reciprocating internal combustion engine, wherein an effective connecting rod length of the connecting rod can be changed. To change the effective connecting rod length, the connecting rod has a hydraulic length adjustment device with at least one hydraulic working chamber, at least one hydraulic duct for discharging hydraulic medium from the hydraulic working chamber, at least one valve recess having a valve recess longitudinal axis, and a valve device comprising a valve chamber arranged in the valve recess. The valve device is thereby designed to open and/or block a hydraulic medium outflow from the hydraulic working chamber. The hydraulic duct is arranged in a flow path between the valve device and the hydraulic working chamber and opens at a first end into the valve recess at an orifice opening in an inner wall section of the valve recess.

The invention further relates to a reciprocating piston engine having such a connecting rod as well as a vehicle having such a reciprocating piston engine.

In order to make vehicles, in particular motor vehicles, more powerful and/or efficient, reciprocating internal combustion engines having a variable compression ratio are known from the prior art. Various measures for changing the compression ratio in a reciprocating piston engine are commonly known from the prior art. One such measure for example comprises varying the absolute top and bottom dead center positions of a piston cyclically movable up and down in a cylinder of the reciprocating internal combustion engine by accordingly changing an effective length of a connecting rod, which is in particular defined by a distance between a first axis of rotation, about which the connecting rod is preferably rotatable around a crankshaft by its large connecting rod eye in a functional state of use in a reciprocating piston engine, and a second axis of rotation about which the connecting rod is preferably rotatable around a piston pin by its small connecting rod eye.

Providing a correspondingly designed length adjustment device is known for changing the effective connecting rod length, with various length adjustment concepts being known.

For example, a hydraulic length adjustment device having connecting rod parts which are relatively displaceable to one another, in particular telescopically displaceable into or out of each other, is known from WO 2016/203047 A1, wherein the associated length adjustment device normally has one or more hydraulic chambers which, depending on the desired connecting rod length, can be filled with or drained of a hydraulic medium. The hydraulic flow to and from the hydraulic chambers, and thus the length adjustment, can be controlled by means of one or more control valves and one or more check valves. The control device thereby comprises a first and a second valve chamber, in each of which is arranged a respective valve body which is pressed by a spring against a valve seat in a closed state, wherein the valve chambers are in each case fluidly connected to one of the hydraulic ducts. One of the respective valve bodies arranged in the valve chambers, which can be pressed against the valve seat by the restoring force of the spring and which are operatively connected to one another via a displaceable connecting device, can in each case be lifted off the valve seat against the restoring force of a valve spring by the connecting device and the respective valve chamber thus fluidly connected to the hydraulic medium supply channel while the other valve body blocks the flow connection to the hydraulic medium supply channel, whereby the length adjustment, in particular a hydraulic medium inflow and outflow into and out of the hydraulic chambers of the length adjustment device, can be controlled.

It is a task of the invention to provide an alternative, in particular improved, hydraulic adjustable-length connecting rod, preferably an adjustable-length connecting rod which, in comparison to the above-described connecting rods known from the prior art, is in at least some cases able to reduce the loads acting on the individual components of the length adjustment device at least for individual components, particularly during operation in a reciprocating piston machine and, as a result, in particular increase service life.

This task is solved by an adjustable-length connecting rod, by a reciprocating piston engine having such a connecting rod, and by a vehicle having such a reciprocating piston engine according to the independent claims.

A first aspect of the invention relates to an adjustable-length connecting rod for a reciprocating piston engine, in particular for a reciprocating internal combustion engine, wherein an effective connecting rod length of the connecting rod can be changed, in particular set, wherein to change the effective connecting rod length, the connecting rod comprises a hydraulic length adjustment device with at least one hydraulic working chamber, at least one hydraulic duct for discharging hydraulic medium from the hydraulic working chamber, at least one valve recess comprising a valve recess longitudinal axis, and a valve device having a valve chamber arranged in the valve recess, wherein the valve device is designed to open and/or block a hydraulic medium outflow from the hydraulic working chamber, and wherein the hydraulic duct is arranged in a flow path between the valve device and the hydraulic working chamber and a first end opens into the valve recess at an orifice opening in an inner wall section of the valve recess.

According to the invention, the valve device comprises at least one outer wall section of closed configuration, i.e. with no through openings, opposite the orifice opening at least in one region opposite the orifice opening and at least partially surrounds the valve chamber of the valve device and in particular comprises no through openings into the interior of the valve chamber, wherein the outer wall section of the valve device of closed configuration forms a flow duct together with the inner wall section of the valve recess surrounding the orifice opening, wherein the flow duct is configured to at least partially divert hydraulic medium exiting the hydraulic duct and entering the valve recess in a first direction of flow into a second direction of flow differing from the first direction of flow prior to the entry into the valve chamber of the valve device.

By means of the closed outer wall section, which at least partially surrounds the valve chamber, it is possible to prevent hydraulic medium flowing out of the hydraulic working chamber from directly entering into the valve chamber. Components arranged in the valve chamber, such as for example valve bodies or valve springs, can thereby be protected against damage from the hydraulic medium which flows, in particular "shoots," through the hydraulic duct at a high flow velocity when the valve device is opened and as a result hits the valve device with high momentum due to the high working pressures that can occur in the associated hydraulic working chamber and can amount to over 3,000 bar. Without the inventive diversion of the hydraulic medium, cavitation effects in particular can thus occur, which can lead to damaging the component surfaces and consequently to mechanical weakening and ultimately failure.

The closed outer wall section opposite the orifice opening, which acts like a shield, can easily prevent the hydraulic medium from directly entering the valve chamber at high flow velocity and/or high pressure and the components arranged in the valve chamber can be protected. This reduces the mechanical stress on these components and in some cases increases their service life.

Given an appropriate design of the diversion, a diverting of the flow can achieve a throttling and a dissipating of flow energy, in particular a reduction in flow velocity. This can thereby reduce the risk of cavitation.

Moreover, the diversion, in particular a selective diversion, can readily achieve an advantageous, in particular simple guidance of the flow for a particularly advantageous entry of the hydraulic medium into the valve chamber.

In order to avoid damage to the closed outer wall section, it can in some cases be advantageous for the outer wall section to comprise at least one hardened surface or a correspondingly suitable coating, for example a wear-resistant layer or the like, e.g. a PVD or CVD coating.

Furthermore, the closed outer wall section can comprise a surface structure advantageous to influencing the flow and/or have correspondingly suitable flow influencing elements, wherein a surface structure which in particular minimizes flow energy, particularly a friction-generating and/or direction-changing structure, and/or accordingly acting flow influencing elements, can in most cases be regarded as being advantageous.

In some cases, coating the closed outer wall section with a friction-enhancing coating can also be advantageous. However, the hydraulic medium should not be able to erode the coating since in one advantageous embodiment of a connecting rod according to the invention, a hydraulic circuit for the hydraulic length adjustment can be fluidly connected to an oil circuit of an associated reciprocating piston machine or, respectively, fluidly connected to an inventive reciprocating piston engine. Eroded particles of the coating could thereby result in damaging the reciprocating piston engine.

At least one valve recess of a connecting rod according to the invention can be manufactured as a blind hole-like recess or a blind hole, in particular with a valve recess opening on one longitudinal side of the valve recess, in particular as a valve recess comprising at least one section with an internal thread, particularly having an internal thread adjacent the valve recess opening. This necessitates only securing the valve device from falling out of the valve recess on one side and enables the use of particularly a screw, in particular a plug screw, as a securing means. In some cases, it is advantageous for at least one valve device to be able to be introduced into the respective valve recess as a pre-assembled unit.

In one advantageous embodiment of an adjustable-length connecting rod according to the present invention, the flow duct can be configured to divert the hydraulic medium in a second direction of flow running parallel to the valve recess longitudinal axis of the valve recess. This thereby achieves a particularly advantageous diversion and, over the further course, a particularly advantageous introduction of the hydraulic medium into the valve chamber, in particular an introduction into the valve chamber, which yields particularly low cavitation and thus particularly low component stress, and that in particular while still continuing to be a concurrently sufficient hydraulic medium outflow from the associated hydraulic working chamber.

In a further embodiment of an adjustable-length connecting rod according to the present invention, the flow duct is in particular configured to reduce a flow velocity of a hydraulic medium exiting the hydraulic duct and entering the valve recess prior to the entry into the valve chamber of the valve device. This can thereby reduce the risk of cavitation and thus the risk of damage to the valve device, in particular the components arranged in the valve chamber, and in many cases increase the service life of these components.

In a further advantageous embodiment of an adjustable-length connecting rod according to the present invention, a throttle can be in particular additionally arranged in a hydraulic duct section adjacent to the valve recess or said hydraulic duct section can be designed as a throttle. To that end, the hydraulic duct can for example exhibit a reduced flow cross-section, in particular compared to an antecedent, in particular adjacent hydraulic duct section, e.g. a flow cross-section reduced to 50% or less of a preceding flow cross-section, or a flow cross-section reduced to 25% or less of a preceding flow cross-section, or can be directly adjacent the orifice opening.

The hydraulic medium flow velocity can thereby already be reduced prior to entering the valve recess; i.e. ahead of the orifice opening and before hitting the closed wall section. In some cases, it can be advantageous for the throttle to be arranged in the hydraulic duct just ahead of the orifice opening.

For the highest possible flow velocity reduction, the flow duct is in particular configured such that hydraulic medium exiting the hydraulic duct and entering the valve recess in the first direction of flow is diverted by at least 50°, preferably by at least 60°, 70°, 80° or 85°, in particular, however, no more than 90°, 100°, 120°, 150° or 180°, prior to the entry into the valve chamber of the valve device.

In a further advantageous embodiment of an adjustable-length connecting rod according to the present invention, the hydraulic duct can open into the valve recess via a circumferential wall of the valve recess, whereby the hydraulic duct preferably opens into the valve recess at an angle of at least 30°, 45°, 60°, 70°, 80° or 85° to the valve recess longitudinal axis of the valve recess, in particular, however, at an angle of no more than 90° and thus perpendicular to the valve recess longitudinal axis of the valve recess.

In some cases, it can be advantageous for the hydraulic duct to in particular radially open into the valve recess longitudinal axis by the section of the hydraulic duct adjacent to the valve recess.

Given an appropriate design to the other components of the valve device, thereby able to be achieved is the hydraulic medium hitting the closed outer wall section perpendicularly, whereby a particularly high reduction in the flow velocity and thus a particularly good reduction of the cavitation risk can be achieved. Possible damage to the closed outer wall section can be easily counteracted by means of an appropriate wear-resistant layer or the like.

In a further advantageous embodiment of an adjustable-length connecting rod according to the present invention, the hydraulic duct can open into the valve recess in such a way that a hydraulic duct longitudinal axis of a hydraulic duct section adjacent the valve recess intersects the valve recess longitudinal axis of the valve recess, whereby the hydraulic duct longitudinal axis of the hydraulic duct section adjacent to the valve recess in particular lies in a common longitudinal median plane of the valve recess with the valve recess longitudinal axis.

Such an in particular central opening of the hydraulic duct into the valve recess enables achieving particularly advantageous hydraulic medium flow behavior. In particular, the generating of eddies or respectively a vortex can be prevented. It is advantageous for the hydraulic medium to not enter the valve chamber in a vortex since doing so can lead to adverse effects, in particular a negative influence on the components of the valve device. This can for example result in an undesired rotation of the valve body and thus to imprecise valve lift.

In some applications, particularly when there is insufficient space available for a central opening, it can however be more advantageous for the hydraulic duct to open into the valve recess eccentrically, and thus offset, in particular eccentric to the valve recess longitudinal axis. In this case, additional flow influencing elements able to reduce or compensate for the potentially undesirable flow effects due to the eccentric opening can in particularly be provided where necessary.

In a further advantageous embodiment of an adjustable-length connecting rod according to the present invention, the outer section of the valve device of closed configuration, which at least partially surrounds the valve chamber of the valve device, can at least partially surround the valve chamber in the circumferential direction in relation to the valve recess longitudinal axis of the valve recess. This can thereby achieve a particularly advantageous inflow of hydraulic medium into the valve recess. In particular able to thereby be achieved is the hydraulic medium initially flowing at least partially around the valve device circumferentially before the hydraulic medium being conducted into the valve chamber. This thereby enables a simple way of creating a flow path over which the hydraulic medium has to travel prior to entering the valve chamber without entailing any appreciable elongation, in particular virtually without any additional installation space. As a result, a significantly improved reduction in the flow velocity can be achieved.

Attention should thereby be paid in each case; i.e. in every possible implementation of a connecting rod according to the invention, to not unduly reducing the flow velocity and/or not dissipating too much flow energy since it would otherwise no longer be possible to achieve a sufficiently fast enough outflow of hydraulic medium from the hydraulic working chamber to change the effective connecting rod length, which can have a detrimental effect on adjusting the effective connecting rod length.

In a further advantageous embodiment of an adjustable-length connecting rod according to the present invention, the flow duct can be an annulus segment extending at least partially in the axial direction and at least partially in the circumferential direction relative to the valve recess longitudinal axis of the valve recess, or an annular space extending at least partially in the axial direction and over the entire circumference; i.e. an annular space completely closed in the circumferential direction. Able to be achieved as a result is a particularly advantageous guidance of the hydraulic medium flow prior to entering the valve chamber.

A particularly simple annular space can be formed when the valve recess is at least partially cylindrical along the valve recess longitudinal axis in the region of the inner wall section surrounding the orifice opening, whereby an associated inner jacket surface preferably limits the annular space radially outwardly, and when the closed outer wall section of the valve device is at least partially of cylinder jacket configuration along the valve recess longitudinal axis, whereby the outer wall section of closed cylinder jacket configuration preferentially limits the annular space radially inwardly.

The closed outer wall section of an adjustable-length connecting rod does not thereby need to exhibit a constant outer diameter in the axial direction; it can also exhibit a varying outer diameter, whereby in this case, however, a gap width of the annular space or annulus segment preferably increases in the direction of flow.

A particularly simple annulus segment can be designed accordingly, albeit not extending over the entire circumference of the valve device but rather only over a part thereof; i.e. only over for example 180° instead of over 360°, as with an annular space closed in the circumferential direction.

In one possible embodiment, an annulus segment can also be formed for example by an axial groove in the closed outer wall section of the valve device which limits the annulus segment radially inwardly or can comprise one or more grooves introduced into a closed outer wall surface.

The inner wall section of the valve recess can alternatively or additionally likewise comprise corresponding grooves. It is, however, of cylindrical configuration. This simplifies the manufacture of the valve recess.

The closed outer wall section of the valve device is preferentially formed by a closed outer surface of a cylinder jacket-shaped section of the valve device, in particular by a closed outer surface of a cylinder jacket-shaped section or a plurality of cylinder jacket-shaped sections of one or more components of the valve device, in particular by a cylinder jacket-shaped region of one or more components of the valve device which exhibits a reduced outer diameter compared to the valve recess in the region around the orifice opening of the hydraulic duct. This thereby allows a particularly simple diversion of the hydraulic medium in a second direction of flow running parallel to the valve recess longitudinal axis.

In a further, particularly preferential advantageous embodiment of an adjustable-length connecting rod according to the present invention, the flow duct can be of closed configuration on a first side and open on an oppositely disposed second side, whereby the flow duct is fluidly connected to the valve chamber particularly via the second side, wherein the flow duct, particularly the annulus segment or the annular space, is of axially closed configuration in particular on the first side and axially open on the oppositely disposed second side relative to the valve recess longitudinal axis.

The flow duct, in particular the annulus segment or the annular space, can thereby be axially closed in particular on the first side, for example by an outer wall section of the valve device, particularly by an outer wall section adjoining a sealing surface or designed as a sealing surface.

This thereby allows a particularly simple way of achieving an advantageous hydraulic medium flow within the valve recess, in particular up until entry into the valve chamber.

Doing so enables achieving a particularly simple diversion of the hydraulic medium in a second direction of flow running parallel to the valve recess longitudinal axis.

In a further, particularly preferential advantageous embodiment of an adjustable-length connecting rod according to the present invention, the closed outer wall section of the valve device, which together with the inner wall section of the valve recess surrounding the orifice opening forms the flow duct, can comprise a groove and/or a bezel, in particular a groove and/or bezel extending at least partially in the circumferential direction, particularly an undercut adjoining a collar or a radially extending shoulder.

This thereby allows a particularly simple way of achieving an advantageous hydraulic medium flow within the valve recess, in particular up until entry into the valve chamber. Doing so, particularly by means of an undercut, in particular enables achieving a particularly simple diversion of the hydraulic medium in a second direction of flow running parallel to the valve recess longitudinal axis.

In a further advantageous embodiment of an adjustable-length connecting rod according to the present invention, the groove or bezel or undercut can be arranged in the outer wall section particularly in the region of the first side at which the flow duct is preferably axially closed and in particular adjacent to a sealing surface.

In a further embodiment, in particular a further development, of an adjustable-length connecting rod according to the present invention, the groove or bezel or undercut can thereby at least partially, alternatively completely, form a surface which radially limits the annular space, in particular a surface limiting the annular space radially inwardly, wherein the groove or bezel or undercut can in particular be of completely circumferential design.

Within the meaning of the invention, an "undercut" is understood as per DIN 509 as a machining of a rotationally symmetrical inner edge having a specific form and specified dimensions, in particular a groove having a geometry pursuant to DIN 509.

In a further, particularly preferential advantageous embodiment of an adjustable-length connecting rod according to the present invention, the valve device in particular comprises a valve body arranged in the valve chamber able to be lifted from a valve seat along a valve lift axis for opening the valve device against a restoring force, in particular against a restoring force of a valve spring, whereby the outer section of the valve device of closed configuration, which together with the inner wall section surrounding the orifice opening forms the flow duct, at least partially surrounds the valve chamber in the region of the valve body and/or the valve spring, wherein the valve device is in particular arranged with the valve lift axis parallel to the valve recess longitudinal axis of the valve recess; i.e. particularly such that the valve lift axis of the valve body runs parallel to the valve recess longitudinal axis of the valve recess.

Such a valve device enables achieving the opening and blocking of a hydraulic medium outflow from an associated hydraulic working chamber in a particularly advantageous and simple manner.

Because the outer section of closed configuration at least partially surrounds the valve chamber in the region of the valve body and/or the valve spring and in particular prevents hydraulic medium from entering the valve chamber in this region, the valve body and/or the valve spring can be easily protected against damage from being directly struck by the hydraulic medium and, as a result, from resultant cavitation, for example, and thus the loads acting on the valve body and/or the valve spring reduced. The service life of the valve body and/or valve spring can consequently be increased in some cases.

For a particularly advantageous length adjustment device, at least one valve device designed as such is in particular arranged with the valve lift axis parallel to a crankshaft longitudinal axis with regard to a functional state of use of the connecting rod in a reciprocating piston engine. Valve body accelerations due to a lifting movement of the connecting rod, which could lead to an undesired opening of the valve device, can thereby be prevented.

Proven to be particularly suitable are balls as valve bodies and straight compression springs as valve springs.

In a further, particularly preferential advantageous embodiment of an adjustable-length connecting rod according to the present invention, the valve device has a valve seat unit comprising a valve seat, wherein the outer wall section of closed configuration, which together with the inner wall section of the valve recess surrounding the orifice opening forms the flow duct, is formed by an outer wall section of the valve seat unit.

This enables the realizing of a particularly compact valve device as the inventive flow diversion function can be integrated into the valve seat unit. Hence, no additional component is required for the outer wall section of closed configuration.

Preferentially, the valve seat unit is thereby designed such that the flow duct is preferably axially closed toward the valve seat and open toward the valve spring, wherein the outer wall section of closed configuration preferably extends from the valve seat toward the valve spring to that end, in particular in the form of a jacket and preferentially at least partially around the valve body and/or valve spring, particularly in the form of a cylinder jacket and particularly preferentially completely circumferentially; i.e. over the entire circumference. The valve seat unit can exhibit an in particular sleeve-shaped section to that end, wherein an outer surface of the sleeve-shaped section at least partially forms the closed outer wall section.

It is not thereby necessary for the closed outer wall section of an adjustable-length connecting rod to exhibit a constant outer diameter in the axial direction; depending on an advantageous flow contour, it can in particular also decrease from the valve seat.

In an alternative or additional embodiment, in particular in a further preferential and advantageous embodiment of an adjustable-length connecting rod according to the present invention, the valve device comprises a spring guide unit for axially supporting and/or guiding the valve spring, whereby the outer wall section of closed configuration, which together with the inner wall section of the valve recess surrounding the orifice opening forms the flow duct, is in particular formed by an outer wall section of the spring guide unit.

This enables the realizing of a particularly compact valve device as the inventive flow diversion function can be integrated into the spring guide unit. Hence, no additional component is required for the outer wall section of closed configuration. The spring guide unit can exhibit an in particular sleeve-shaped section to that end, wherein an outer surface of the sleeve-shaped section at least partially forms the closed outer wall section.

The closed outer wall section thereby preferentially extends from the valve spring toward the valve seat, preferably in the form of a jacket and at least partially around the valve spring and/or valve body, particularly in the form of a cylinder jacket and/or cone-shaped jacket and particularly preferentially completely circumferentially; i.e. over the entire circumference, wherein the closed outer wall section axially extends in particular over the valve body.

It is not thereby necessary for the closed outer wall section of an adjustable-length connecting rod to exhibit a constant outer diameter in the axial direction; depending on an advantageous flow contour, it can in particular also decrease from the valve spring.

In one alternative embodiment, the outer wall section of closed configuration can however also be formed by another component, in particular by the outer wall of another component, for example by the outer wall of a sleeve or the like surrounding the valve chamber in this region.

In a further advantageous embodiment of an adjustable-length connecting rod according to the present invention, the spring guide unit can comprise, in particular additionally, a spring guide element, preferably having a cylindrical recess in which the valve spring is at least partially guided and at the bottom of which the valve spring can be supported, in particular by its far end from the valve body. This enables the realizing of a particularly compact valve device.

In a further advantageous embodiment of an adjustable-length connecting rod according to the present invention, the valve device comprises a securing means, in particular a plug screw, by means of which parts of the valve device or the entire valve device are secured against falling out of the valve recess, whereby the securing means in particular is designed for the axial support and/or guidance of the valve spring.

The securing means can additionally be in particular designed as a spring guide element and be part of the spring guide unit or form the spring guide unit, whereby the securing means can in particular comprise a cylindrical recess in which the valve spring can be at least partially guided and at the bottom of which the valve spring can be supported, in particular by its far end from the valve body.

In a further advantageous embodiment of an adjustable-length connecting rod according to the present invention, an inner wall section adjacent the valve seat of the valve body and/or at least partially surrounding the valve body in the region of the valve seat in the form of a jacket can comprise at least one depression extending at least over one defined region in the circumferential direction and at least radially outwardly and axially, preferably at least one depression of semicircular, semi-elliptical, kidney-shaped or atom-shaped radial cross section, particularly a plurality of such depressions arranged in even circumferential distribution.

In some cases thereby able to be achieved, given a commensurate configuration of the depression or plurality of depressions, is a better flow around, in particular an at least partial flow past the valve body from the valve spring side toward the valve seat and, depending on the configuration, even as far as the valve seat. In many cases, this can thereby easily prevent the valve body from "tightly suctioning" to the valve seat. As a result, the actuating force needed to open the valve device can be kept relatively low and in particular within a narrow tolerance range.

In a further advantageous embodiment of an adjustable-length connecting rod according to the present invention, the valve device is an actuatable control valve device, in particular a control valve device able to be actuated via a rod-like, axially displaceable actuating element, wherein in a first actuating position of the rod-like actuating element, the valve body of the control valve device is lifted from the valve seat and a hydraulic medium outflow via the hydraulic duct is opened from the hydraulic chamber into the valve recess and through the valve chamber, and in a second actuating position of the actuating element, the valve body of the control valve device rests against the valve seat and a hydraulic medium outflow from the hydraulic chamber into the valve recess and through the valve chamber via the hydraulic duct is blocked. A particularly advantageous length adjustment device is thereby provided.

Preferentially, the rod-like actuating element is thereby axially displaceable along an actuation axis oriented parallel to the valve lift axis, in particular along an actuation axis coincident with the valve lift axis, as is for example the case with some of the exemplary embodiments of adjustable-length connecting rods of hydraulic length adjustment disclosed in WO 2016/203047 A1. The rod-like actuating element can however also be axially displaceable along an actuation axis oriented perpendicular to the valve lift axis.

In a further advantageous embodiment of an adjustable-length connecting rod according to the present invention, the control valve device can further comprise an actuator body which is arranged between the valve body and the rod-like actuating element and in particular serves in mechanically transmitting actuation of the actuating element to the valve body.

Hindrances related to the given available space can thereby be overcome. For example, too great of a distance from the rod-shaped actuating element to the valve body can thereby be bridged. Furthermore, in some cases, a valve seat having a more advantageous geometry, particularly as regards the mechanical stability of the valve seat, can thus be achieved.

In a further advantageous embodiment of an adjustable-length connecting rod according to the present invention, an inner wall section adjacent to a valve seat of the actuator body and/or at least partially surrounding the actuator body in the region of the associated valve seat in the form of a jacket comprises at least one bypass through opening extending at least over one defined region in the circumferential direction and at least radially outwardly and axially, preferably at least one bypass through opening exhibiting a semicircular, semi-elliptical, kidney-shaped or atom-shaped radial cross section, particularly a plurality of such bypass through openings arranged in even circumferential distribution.

In so doing, a greater volumetric hydraulic medium flow can be discharged from the valve chamber past the valve body and the actuator body into a hydraulic chamber or duct adjacent to the actuator body. In turn, an associated hydraulic working chamber of the length adjustment device can thus be drained more quickly and the effective connecting rod length changed.

In a particularly advantageous embodiment of an adjustable-length connecting rod according to the present invention, the connecting rod, in particular the length adjustment device, comprises a hydraulic cylinder having a first hydraulic working chamber and a second hydraulic working chamber separated in particular by a double-acting hydraulic piston formed particularly as a stepped piston; i.e. having two differently sized effective areas.

In a further embodiment, the connecting rod further comprises a hydraulic medium supply line and/or drainage line, each of which can be fluidly connected to the first hydraulic working chamber and/or the second hydraulic working chamber. In this advantageous embodiment, the length of the connecting rod can be directly set by means of the position of the hydraulic piston in the hydraulic cylinder. Particularly an inflow and outflow of a hydraulic medium into and out of the two hydraulic working chambers of the hydraulic cylinder can be controlled via the length adjustment device.

The hydraulic cylinder can thereby accommodate the acting forces during movement of the connecting rod and relay them to the hydraulic medium. When the hydraulic medium supply line and potentially the drainage are closed, a change to the connecting rod length can be prevented. In contrast, when the hydraulic medium supply line/drainage is open, particularly in consequence of the corresponding control valve switch position, a change in the length of the connecting rod can be effected according to the forces or respectively pressures applied.

For the basic functioning of such an adjustable-length connecting rod, reference is made to WO 2016/203047, as has already been mentioned several times.

In one advantageous possible embodiment of an inventive connecting rod, the length adjustment device can thereby in particular comprise one respective control valve device, preferably a control valve device as described above, for each hydraulic working chamber for opening and/or blocking a hydraulic medium outflow from the respective hydraulic working chamber as well as a check valve device by means of which hydraulic medium can be drawn into but cannot flow out of the respective hydraulic working chamber during a lifting movement.

In one advantageous possible embodiment of a connecting rod according to the invention, both control valve devices can thereby be actuated by means of a common rod-shaped, axially displaceable actuating element, whereby the actuating element can in particular be actuated by means of a double-acting actuating piston subject to an applied hydraulic pressure, in particular subject to a given oil pressure in a reciprocating piston engine, particularly a reciprocating internal combustion engine.

A second aspect of the invention relates to a reciprocating piston engine, in particular a reciprocating internal combustion engine, having an adjustable-length connecting rod designed according to the first aspect of the invention.

A third aspect of the invention relates to a vehicle, in particular a motor vehicle, having a reciprocating piston engine designed according to the second aspect of the invention.

These and further features and advantages will become apparent not only from the claims and the description but also from the drawings, whereby the individual features can in each case be realized individually or in groups in the form of subcombinations in an embodiment of the invention and, given technical feasibility, can in themselves constitute an advantageous as well as protectable implementation.

Some of the noted features or respectively properties relate to both an inventive adjustable-length connecting rod as well as an inventive reciprocating piston engine and/or an inventive vehicle. While some of these features and properties are only described once, they do, however, apply independently of one another within the scope of technically feasible configurations to both an inventive adjustable-length connecting rod as well as an inventive reciprocating piston engine and an inventive vehicle.

The invention is explained in greater detail below on the basis of non-limiting exemplary embodiments as depicted in the figures, wherein components and/or devices having the same function can also have the same reference numerals even across a plurality of exemplary embodiments. Shown therein at least partially schematically:

FIG. 1 a first exemplary embodiment of an adjustable-length connecting rod according to the invention in side view, FIG. 2 a first connecting rod part of the adjustable-length connecting rod from FIG. 1, likewise in side view, with a partial depiction of concealed contours, FIG. 3a a basic functional diagram of the hydraulic length adjustment device of the connecting rod from FIGS. 1 and 2, depicted in a first state for setting a maximum effective connecting rod length, FIG. 3b a basic functional diagram of the hydraulic length adjustment device of the connecting rod from FIGS. 1 and 2, depicted in a second state for setting a minimum effective connecting rod length, FIG. 4a a detail of a section through the inventive connecting rod from FIGS. 1 and 2 along the Y-Y' sectional plane in a second state for setting a minimum effective connecting rod length, FIG. 4b a detail of a section through the inventive connecting rod from FIGS. 1 and 2 along the Y-Y' sectional plane in a first state for setting a maximum effective connecting rod length, FIG. 5 an enlarged detail from FIG. 4a in the region of the upper control valve device, wherein both the first state for setting the maximum effective connecting rod length and the second state for setting the minimum effective connecting rod length are indicated, FIG. 6 a greatly enlarged section from FIG. 5 in a perspective half-section from a different perspective, FIG. 7 a detail of a partial section through the inventive connecting rod from FIGS. 1 and 2 in the region of the lower control valve device 14A along a different sectional plane than in FIGS. 4a and 4b, FIG. 8 a detail of a longitudinal section through the inventive connecting rod from FIGS. 1 and 2 along a plane oriented perpendicular to a crankshaft axis in the area above the valve devices of the length adjustment device above the large connecting rod eye, FIG. 9 a detail of a partial section through the inventive connecting rod from FIGS. 1 and 2 along a further sectional plane in the region of the lower control valve device 14A, FIG. 10 a greatly simplified schematic representation in a substantially oblique perspective view from above onto or respectively into the valve recess 6A of the lower control valve device 14A, FIG. 11 a side view of the valve recess 6A from FIG. 10 with the actuator body, FIG. 12 a detail of a first section through a second exemplary embodiment of an inventive adjustable-length connecting rod along a first sectional plane X-X' analogous to FIG. 1, and FIG. 13 a detail of a second section of the adjustable-length connecting rod from FIG. 12 along a second sectional plane Y-Y' analogous to FIG. 1.

FIG. 1 shows a first exemplary embodiment of an adjustable-length connecting rod 1 in side view, wherein the connecting rod 1 comprises a first connecting rod part 2, or a first connecting rod section 2 respectively, as well as a second connecting rod part 4 or a second connecting rod section 4 respectively. The first connecting rod part 2 of the connecting rod 1 thereby has a large connecting rod eye 3 for connecting the connecting rod 1 to a crankshaft (not depicted here) and the second connecting rod part 4 of the connecting rod 1 has a small connecting rod eye 5 for connecting the connecting rod 1 to a piston (likewise not depicted). The first connecting rod part 2 and the second connecting rod part 4 are thereby displaceable relative to each other along a connecting rod longitudinal axis Z, in particular telescopically displaceable into and out of each other, so that an effective connecting rod length L of the connecting rod 1 can be changed, in particular set, whereby the effective connecting rod length can be adjusted by means of a length adjustment device 7, wherein in particular a minimum effective connecting rod length and a maximum effective connecting rod length can be set.

In the present example, the connecting rod 1, in particular the first connecting rod part 2, has two control valve recesses 6A and 6B and two check valve recesses 8A and 8B which are preferably arranged above the large connecting rod eye 3 and between the large connecting rod eye 3 and the small connecting rod eye 5, particularly in a region of the connecting rod 1 on the large connecting rod eye 3, and preferably run perpendicular to the connecting rod longitudinal axis Z and parallel to a crankshaft axis with regard to a functional state of use of the connecting rod 1 in a reciprocating piston engine.

A respective control valve device 14A/14B is arranged in each of the control valve recesses 6A and 6B (see FIG. 2) and secured by way of a securing means 9, in particular a plug screw 9 screwed into the respective control valve recess 6A/6B, and thereby in particular protected on the one hand from falling out of the associated control valve recess 6A/6B as well as further being axially fixed in the control valve recess 6A/6B in this case.

A respective check valve device 15A/15B is arranged in each of the check valve recesses 8A and 8B (see FIG. 2) and likewise secured by a securing means 9 and thereby likewise protected from falling out of the associated check valve recess as well as further being axially fixed in this case in the check valve recess 8A/8B.

FIG. 2 shows the first connecting rod part 2 of the adjustable-length connecting rod 1 from FIG. 1, likewise in side view, with a partial depiction of concealed contours as indicated by the dashed lines. Recognizable therefrom is that the first connecting rod part 2 in particular exhibits a guide and hydraulic cylinder 10 extending along the connecting rod longitudinal axis Z. The hydraulic cylinder 10 is thereby designed and configured to at least partially accommodate the second connecting rod part 4 of the connecting rod 1 shown in FIG. 1 and guide the second connecting rod part 4, which is displaceable within the guide and hydraulic cylinder 10 and along the connecting rod longitudinal axis Z relative to the first connecting rod part 2 and can in particular be telescopically inserted into and withdrawn from the first connecting rod part 2 in order to change the effective connecting rod length L.

The part of the second connecting rod part 2 of the connecting rod 1 ahead of the hydraulic cylinder 1 is thereby preferably designed as a hydraulic piston 17 (see FIGS. 3a and 3b), in particular as a stepped piston, and together with the hydraulic cylinder 10 forms two hydraulic working chambers 10A and 10B, or (high) pressure chambers respectively, which are not shown in FIG. 2 although visible in FIGS. 3a and 3b. The hydraulic piston 17 and the hydraulic cylinder 10 are thereby part of the length adjustment device 7 for changing, in particular setting, the effective connecting rod length L.

The following will reference FIGS. 3a and 3b in clarifying the basic functioning of the length adjustment device 7, wherein a basic functional diagram of the hydraulic length adjustment device 7 of the connecting rod from FIGS. 1 and 2 is depicted in FIG. 3a in a first state for setting a maximum effective connecting rod length and in FIG. 3b in a second state for setting a minimum effective connecting rod length.

The length adjustment device 7 has a first lower hydraulic working chamber 10A and a second upper hydraulic working chamber 10B able to be filled with a hydraulic medium in a manner which is preferential and generally known from the prior art (see for example WO 2016/064193 A1) in order to change the effective connecting rod length L. By means of hydraulic ducts 11A and 11B as well as by means of control valve devices 14A and 14B and check valve devices 15A and 15B introduced into the control valve recesses 6A and 6B or check valve recesses 8A and 8B respectively, the hydraulic working chambers 10A and 10B can be fluidly connected to a hydraulic medium supply line 12, via which the length adjustment device 7 can in particular be supplied hydraulic medium from the connecting rod bearing in the region of the large connecting rod eye 3 of first connecting rod part 2 (see FIG. 1).

The control valve devices 14A and 14B and check valve devices 15A and 15B are thereby configured to conduct a hydraulic medium flow from the hydraulic medium supply line 12 into the hydraulic ducts 11A and 11B and further into the hydraulic working chambers 10A and 10B, and in particular to control the hydraulic cylinder 10 of the length adjustment device 7, and thus the length adjustment of the connecting rod 1, whereby each hydraulic working chamber 10A and 10B is allocated a respective control valve device 14A/14B and check valve device 15A/15B.

However, the check valve devices 15A and 15B are thereby in particular configured to enable a hydraulic medium flow from the large connecting rod eye 3 into the associated hydraulic working chamber 10A or 10B of the length adjustment device 7 via the hydraulic medium supply line 12 and the hydraulic ducts 11A and 11B so as to prevent a return or outflow in the other direction.

The control valve devices 14A and 14B are likewise configured to enable a hydraulic medium flow from the large connecting rod eye 3 into the associated hydraulic working chamber 10A or 10B via the hydraulic medium supply line 12 and the hydraulic ducts 11A and 11B, yet primarily serve in the selective opening and/or blocking of a hydraulic medium outflow from the respective hydraulic working chamber 10A/10B.

In contrast to the check valve devices 15A and 15B, the control valve devices 14A and 14B each have at least two actuation states, whereby a return flow from the respective hydraulic working chamber 10A/10B is blocked in a first actuation state and is enabled in a second actuation state.

The control valve devices 14A and 14B each comprise to that end a valve body able to be pressed by a valve spring (not further specified) against a valve seat (likewise not further specified) in a valve chamber 31A/31B, which is likewise not further specified in FIGS. 3a and 3b. When the valve body rests against the valve seat, or when the valve body is pressed against the valve seat by means of the valve spring respectively, the respective control valve device 14A/14B is closed and a hydraulic medium outflow from the associated hydraulic working chamber 10A/10B blocked.

To open the control valve device 14A/14B, the respective valve body can be pushed away from the valve seat and thereby lifted by means of a rod-shaped actuating element 16 axially displaceable along an actuation axis. In this state, the control valve device 14A/14B is opened and a hydraulic medium outflow from the associated hydraulic working chamber 10A/10B enabled.

For an improved, in particular more consistent, hydraulic medium outflow from the respective hydraulic working chambers 10A and 10B through the associated control valve device 14A/14B, a respective throttle 18A/18B is in each case provided in a hydraulic duct between the associated hydraulic working chamber 10A/10B and the control valve device 14A/14B in the presently described exemplary embodiment, in particular for reducing flow velocity.

To switch the two control valve devices 14, in particular in each case between the first actuation state, which is shown in FIG. 3a and which effects a maximum effective connecting rod length, and the second actuation state, which is shown in FIG. 3b and which effects a minimum effective connecting rod length, the actuating element 16 is supported in an actuation recess 13 (cf. FIGS. 4a and 4b) of the adjustable-length connecting rod 1, in particular within the second connecting rod part 2, so as to be axially movable, in particular displaceable. The actuating element 16 can thereby itself be actuated hydraulically in this exemplary embodiment, in particular subject to a given oil pressure in a reciprocating piston engine such as described in for example WO 2016/203047, while the control valve devices 14A and 14B can be actuated mechanically. In principle, the actuating means 16 could alternatively also be actuated electromechanically or likewise mechanically or the like.

The actuating means and the control valve devices 14A and 14B are thereby designed and interact such that at any one time, one of the two control valve devices 14A and 14B is in the first actuation state; i.e. a hydraulic medium return from one of the two hydraulic working chambers 10A/10B is blocked, while the other control valve device 14B/14A is in the second actuation state such that a hydraulic medium return from the other hydraulic working chamber 10B/10A is enabled.

If, for example, with regard to the illustration in FIGS. 3a and 3b, a return flow via the left hydraulic duct 11A is blocked and a return flow via the right hydraulic duct 11B is enabled, hydraulic medium can be drawn through the valve devices 14A and 15A as well as through the hydraulic lines 11A into the hydraulic cylinder 10, in particular the lower hydraulic working chamber 10A, with each upstroke from the valve devices 14A and 15A opening toward the hydraulic cylinder 10.

Due to the return flow being blocked by the associated control valve device 14A, however, no hydraulic medium can discharge from the hydraulic working chamber. As a result, this hydraulic working chamber 10A increasingly fills up. In consequence, the second connecting rod part 4 is in turn increasingly pushed out of the first connecting rod part 2 and an enlargement of the effective connecting rod length L effected, in particular to the maximum effective connecting rod length L.

No counterpressure can build up in the other upper hydraulic working chamber 10B from the open return flow due to the other associated control valve device 14B being in the second actuation state.

Should both control valve devices 14A and 14B now be actuated by means of the actuating element 16, whereby the first control valve device 14A opens so that the hydraulic medium can flow out of the lower hydraulic working chamber 10A and the second control valve device 14B closes so that a return flow from the upper hydraulic working chamber 10B is blocked in the region of the hydraulic cylinder 10, hydraulic medium is forced out of the lower working chamber 10A with each downstroke while the upper working chamber 10B increasingly fills up, whereby the effective connecting rod length L is increasingly reduced, in particular to its minimum.

A detail of a section through the inventive connecting rod from FIGS. 1 and 2 along the Y-Y' sectional plane is depicted in FIG. 4a in a second state for setting a minimum effective connecting rod length and in FIG. 4b in a first state for setting a maximum effective connecting rod length, whereby particularly a configuration of the control valve devices 14A and 14B is readily apparent in both these FIGS. 4a and 4b.

The two control valve devices 14A and 14B each comprise a valve body 20A/20B designed as a valve ball and inserted into the associated valve recess 6A/6B, each of which can be pressed against a valve seat 22A/22B formed by the valve recess 6A/6B by means of a valve spring 21A/21B designed as a compression spring, whereby the valve balls within a respective valve chamber 31A/31B can be lifted from the valve seat 22A/22B along a valve lift axis which in this case coincides with a valve recess longitudinal axis L1/L2.

As previously explained with reference to FIGS. 3a and 3b, the control valve devices 14A and 14B can be simultaneously and alternatingly actuated by means of a common, rod-shaped, axially displaceable actuating element 16 pretensioned via a spring element 19 arranged in an actuation recess 13 and secured against falling out by a securing means 24 in the form of a plug screw.

Although in this case, the actuating element 16 is displaceable perpendicular to the valve lift axes of the control valve devices 14A and 14B and not in alignment with same as schematically depicted in FIGS. 3a and 3b. However, the actuating principle is the same.

With the length adjustment device 7 of the inventive connecting rod 1, the actuating element 16 does not act directly on the valve bodies 20A and 20B but rather on an actuator body 23A/23B arranged in each case between them, by means of which a distance between the actuating element 16 and the valve bodies 20A and 20B can on the one hand be bridged and, on the other hand, affords a more advantageous configuration of the valve seats 22A and 22B.

For a simple actuation requiring little force but which is nevertheless reliable, the actuating element 16 comprises a plurality of projections and platforms (not further specified), on and along which the respective actuation bodies 23A and 23B can glide.

The individual components of the control valve devices 14A and 14B are each secured against falling out of the valve recesses 6A and 6B by means of a plug screw 9 as a securing means.

The plug screws 9 thereby additionally serve in this case as respective spring guide elements for guiding and supporting the valve springs 21A/21B.

FIG. 4a shows the connecting rod 1, or length adjustment device 7 respectively, in a second state for setting a minimum effective connecting rod length in which the upper control valve device 14B, with regard to the illustration, is closed (valve body 20B resting against valve seat 22B) while the lower control valve device 14A is open.

A hydraulic medium outflow from hydraulic duct 11B is thus blocked. Hydraulic duct 11A is enabled, although not visible in this sectional view.

FIG. 4b depicts the connecting rod 1, or length adjustment device 7 respectively, in a first state for setting a maximum effective connecting rod length in which the upper control valve device 14B is open (valve body 20B being lifted from valve seat 22B) while the lower control valve device 14A is closed.

Due to the high pressures in the associated hydraulic working chamber 10A/10B, which can be up to 3000 bar, a sudden abrupt outpouring or "gushing" of hydraulic medium from the associated working chamber 10A/10B into the associated hydraulic duct 11A/11B at high flow velocities can occur when switching the length adjustment device 7, in particular when respectively opening one of the two control valve devices 14A and 14B.

In order to prevent damage, particularly from cavitation, to the valve bodies 20A and 20B as well as the valve springs 21A and 21B due to hydraulic medium striking these components at high speed, the control valve devices 14A and 14B according to the invention each have a closed outer wall section 25A/25B disposed opposite of an orifice opening of the hydraulic duct 11A/11B, which can be clearly seen from FIGS. 5 and 6.

Figure 6:
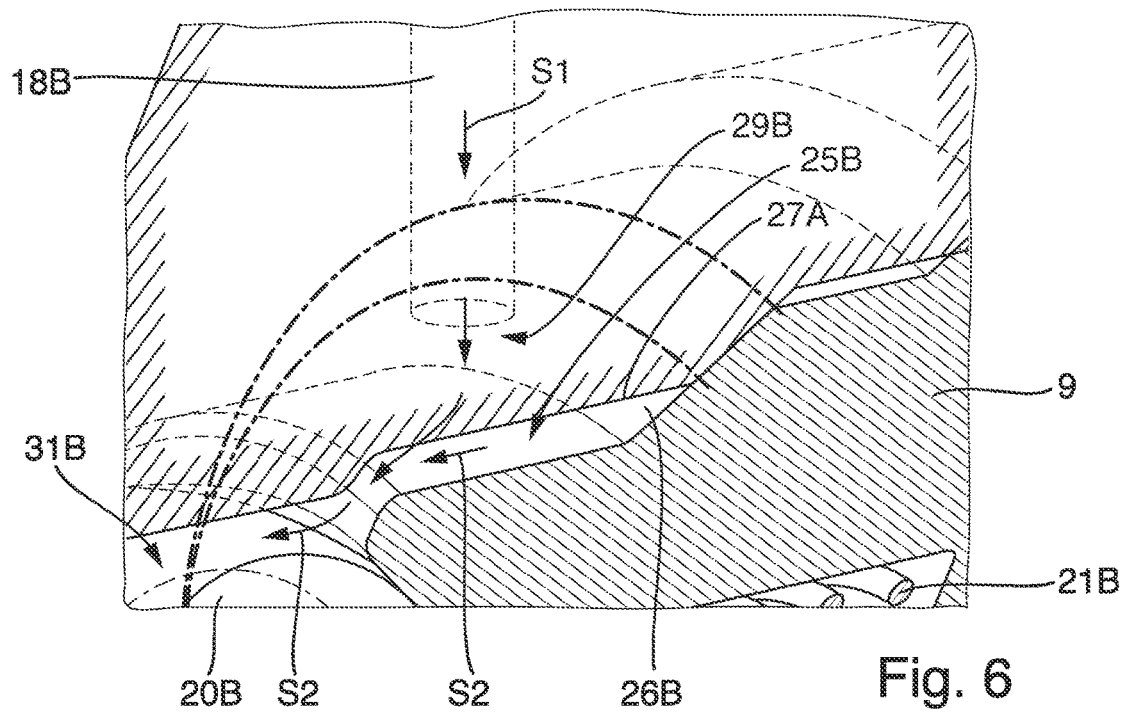
FIG. 6 shows a greatly enlarged section of this FIG. 5 area in a perspective half-section from a different perspective.

Readily apparent from these two figures is how the hydraulic duct 11B, with its section adjacent the valve recess 6B being designed as a throttle 18B and comprising a flow cross-section reduced to 25% compared to an antecedent section, opens into the valve recess 6B at an orifice opening 29B (cf. FIG. 6) inventively opposite the closed outer wall section 25B.

The closed outer wall section 25B thereby forms a flow duct in the form of an annular space together with the inner wall section 27A surrounding the orifice opening 29B, whereby the flow duct according to the invention is configured such that the hydraulic medium exiting the hydraulic duct 11B in a first direction of flow S1 is diverted into a second direction of flow S2 running parallel to the valve recess longitudinal axis L2 in this exemplary embodiment.

Because the inventive closed outer wall section 25B extends at least partially over the valve body 20B and the valve spring 21B and completely surrounds the valve chamber 31B in a sleeve-like manner and circumferentially, the hydraulic medium can be prevented from directly impacting the valve body 20B and the valve spring 21B and the risk of damage to these components thus reduced.

As a result, the hydraulic medium can first be dispersed in the completely circumferentially closed annular space before then being able to be diverted 90° so as to flow parallel to the valve recess longitudinal axis L2 toward an inlet opening (not visibly depicted) and then through same to enter into the valve chamber 31B. After flowing around the valve body 20B and the actuator body 23B, the hydraulic medium can then further flow out of the valve chamber 31B toward the actuating means 16 in a drainage hydraulic duct.

The hydraulic duct 11B of the control valve device 14B, in particular the last section in the region of the throttle 18B, thereby opens into the flow duct at a 90° confluence angle, in particular at an angle of 90° to the valve recess longitudinal axis L2.

The closed outer wall section 25B is in this case thereby formed by an outer surface of a cylindrical section of the plug screw 9 of the valve device 14B and extends as far as a sealing surface 26B, whereby the flow duct is axially closed on a first side and hydraulic medium is conducted toward the valve body 20B and past same into the valve chamber 31B at a reduced flow velocity.

When an inventive connecting rod comprises a plurality of valve devices and a plurality of hydraulic ducts, each can open into the associated valve recess at different angles.

Figure 1:
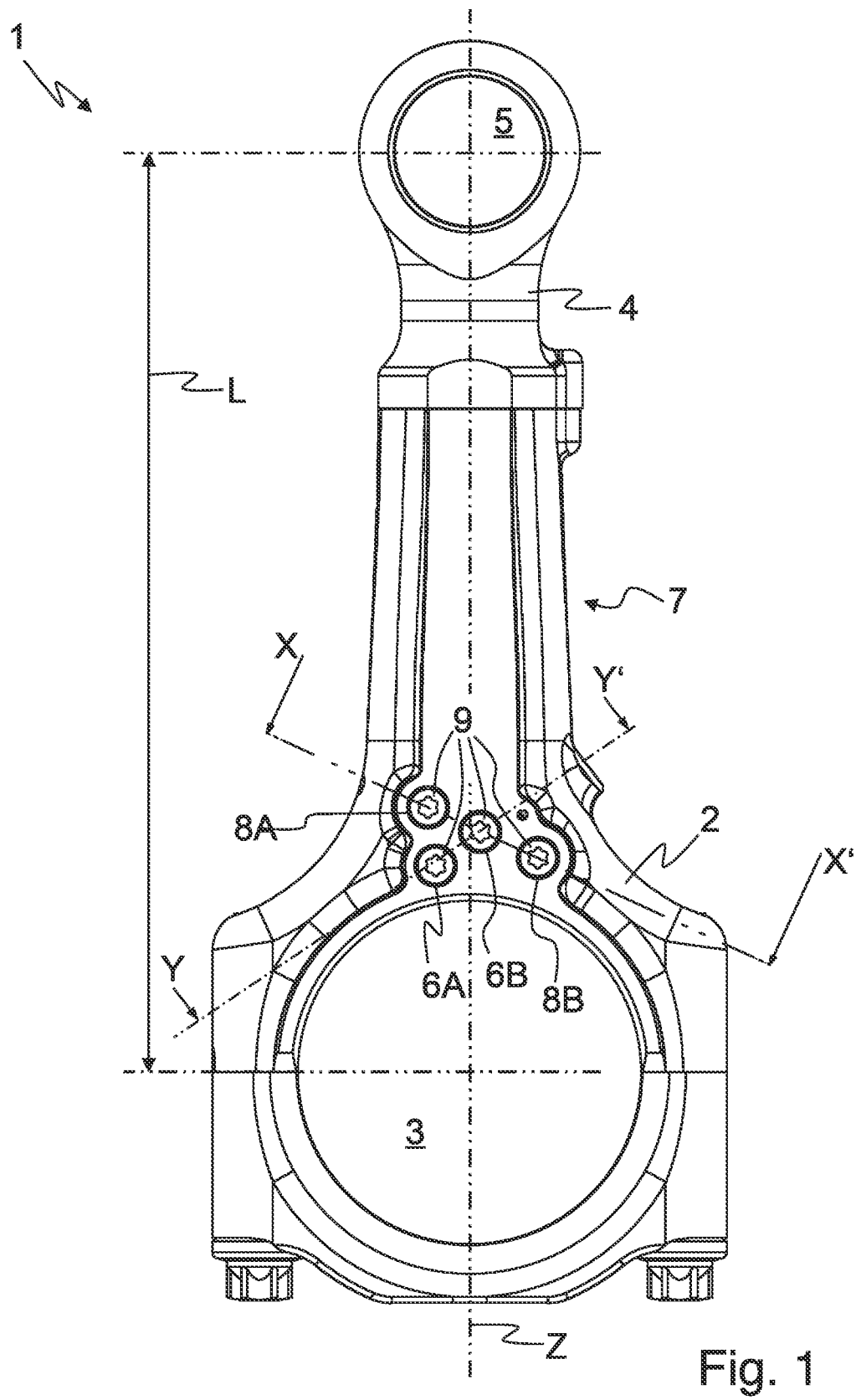
Figure 2:
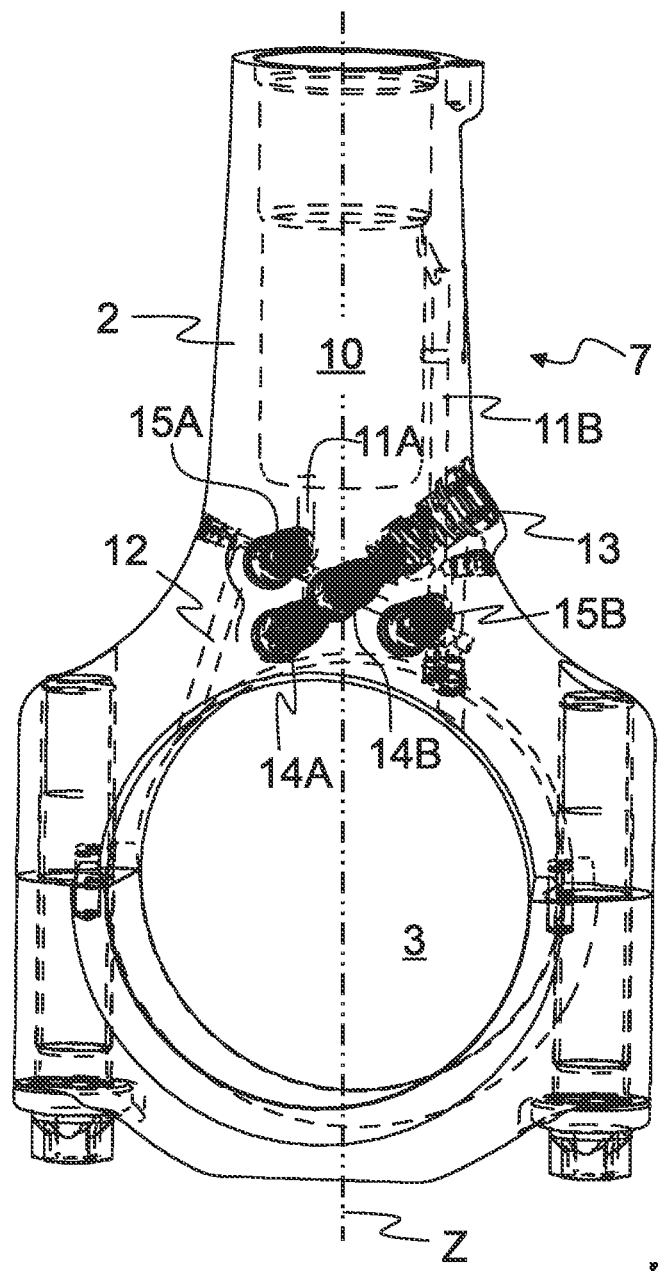
Figure 3A:
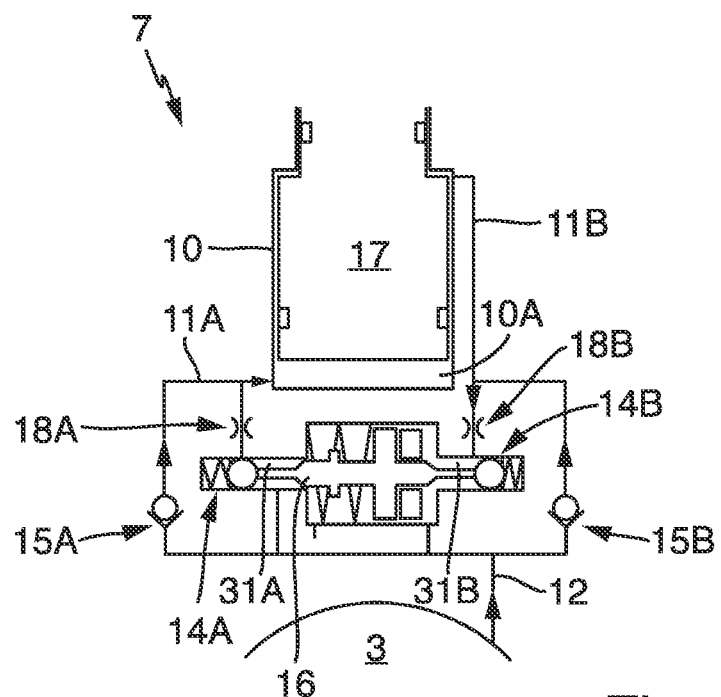
Figure 3B:
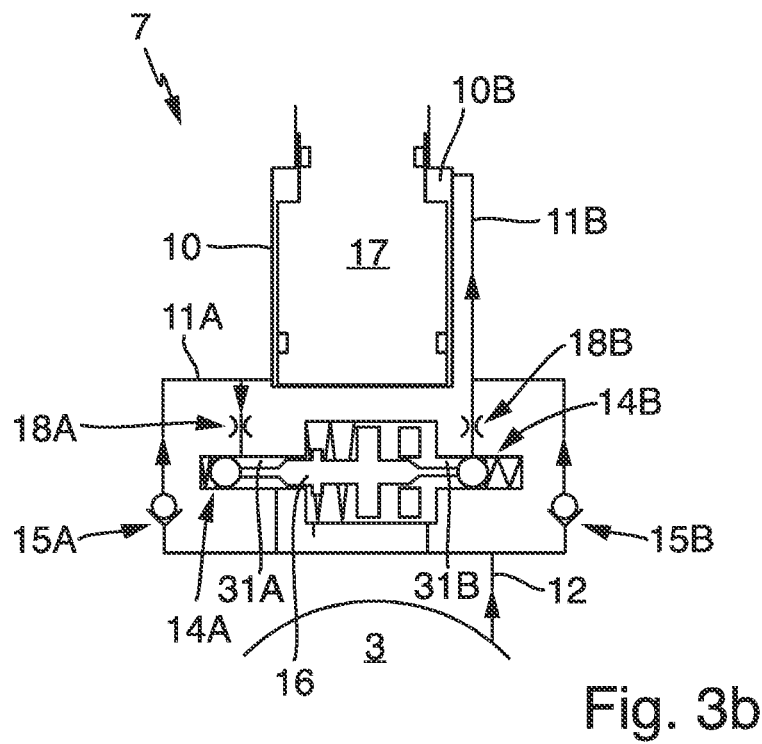
Figure 4A:
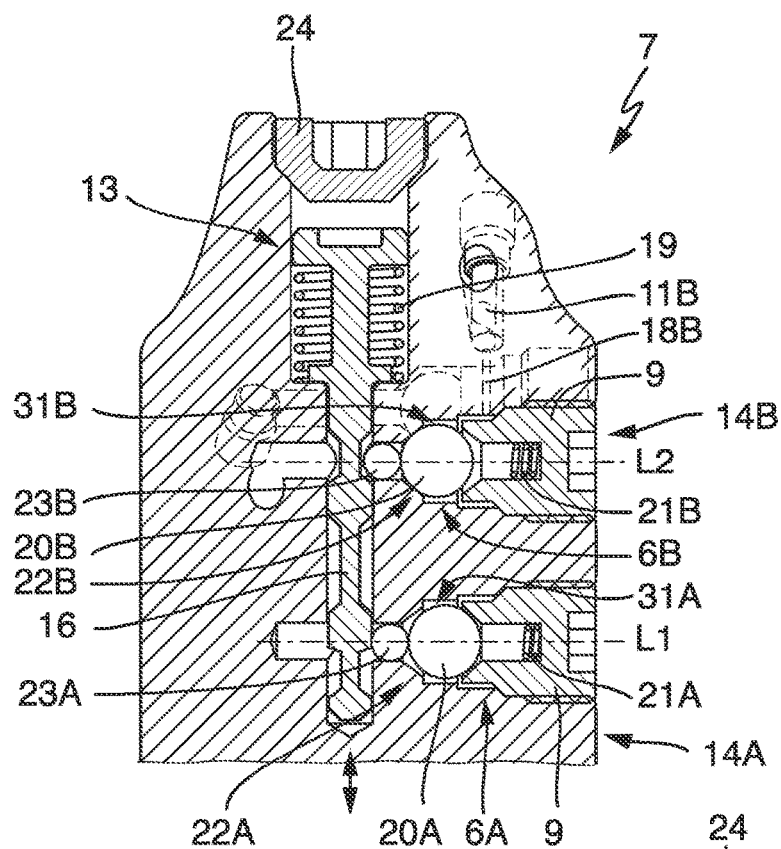
Figure 4B:
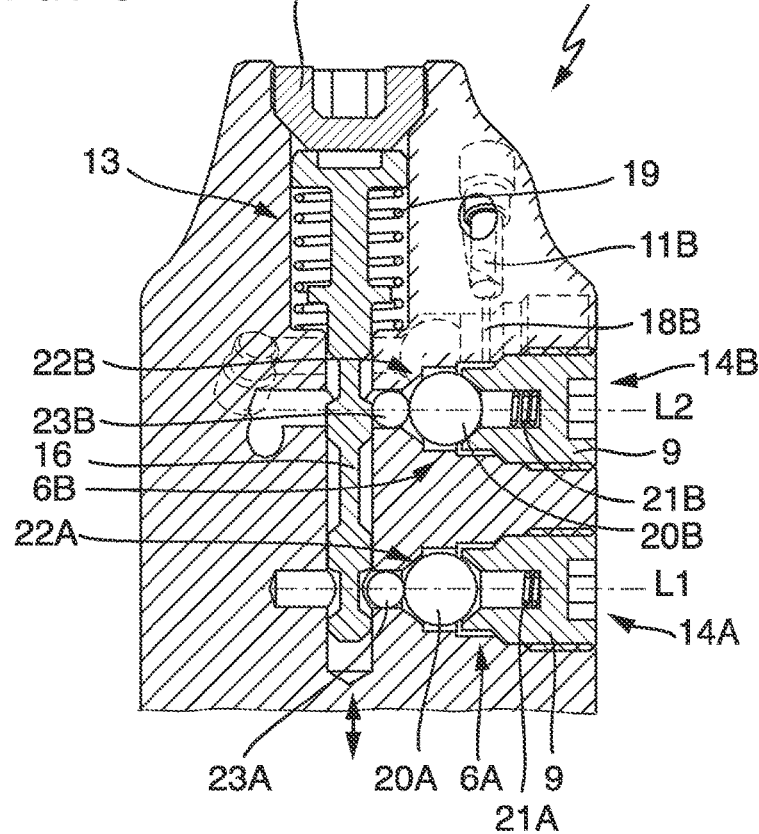
Figure 5:
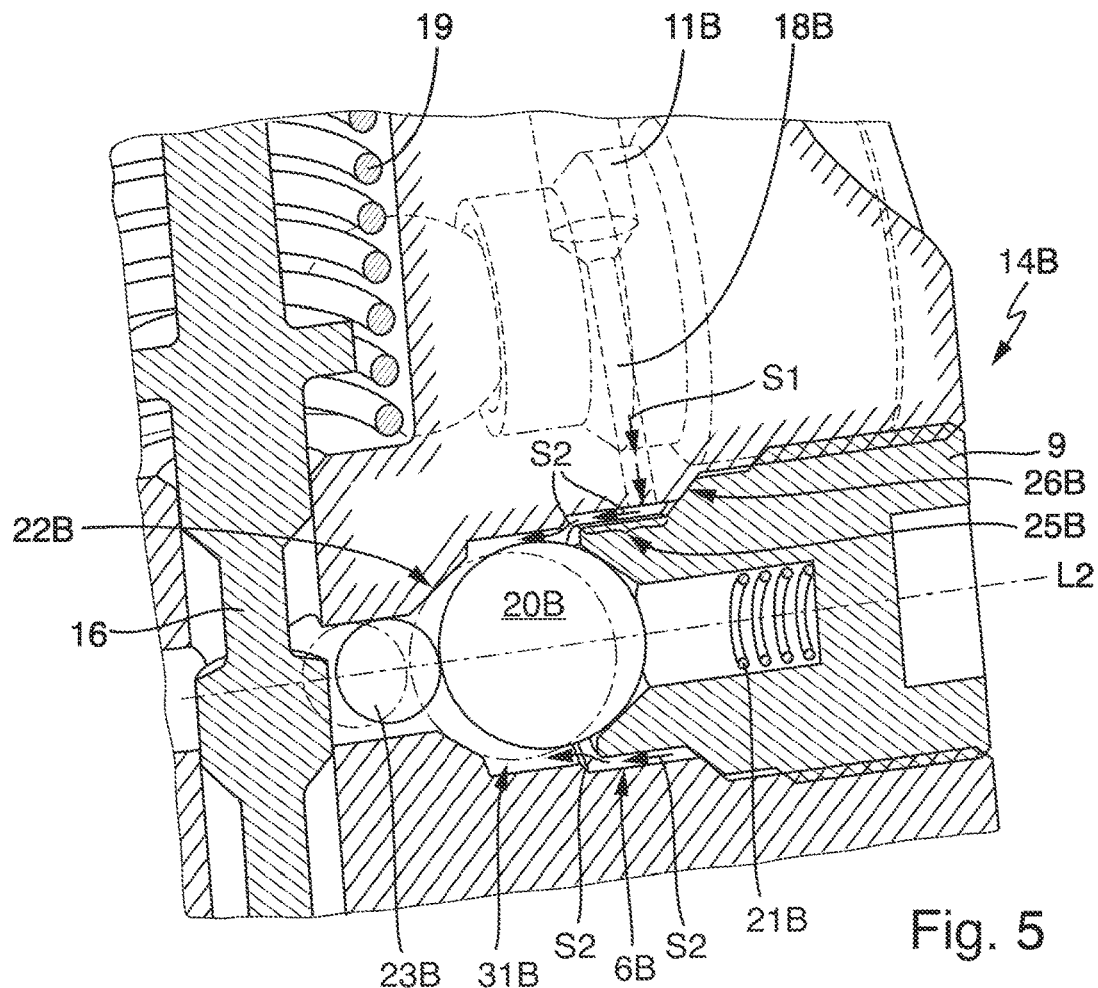
FIG. 5 depicts an enlarged detail from FIG. 4a in the region of the upper control valve device 14B, wherein both the first state for setting the maximum effective connecting rod length as well as the second state for setting the minimum effective connecting rod length are indicated.
Figure 7:
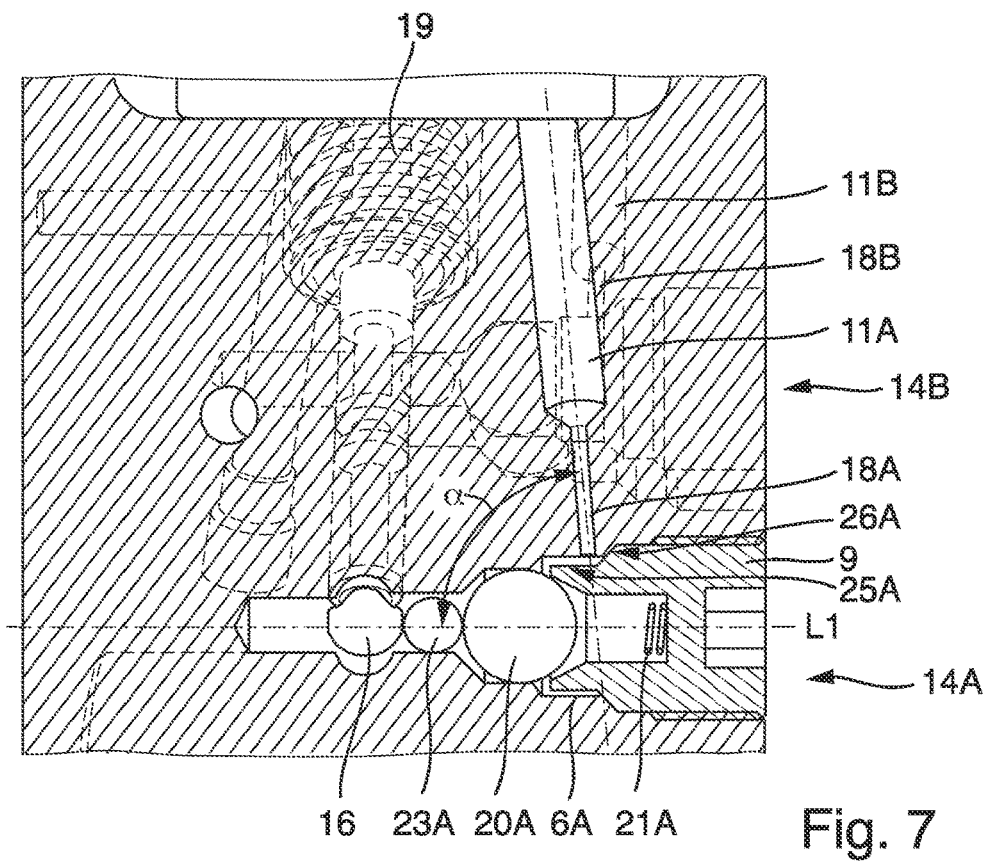

Apparent from FIG. 7, for example, which shows a detail of a partial section through the inventive connecting rod from FIGS. 1 and 2 in the region of the lower control valve 14A along a different sectional plane than as in FIGS. 4a and 4b, is that the hydraulic duct 11A only flows in at a confluence angle of $\alpha=85°$.

Figure 8:
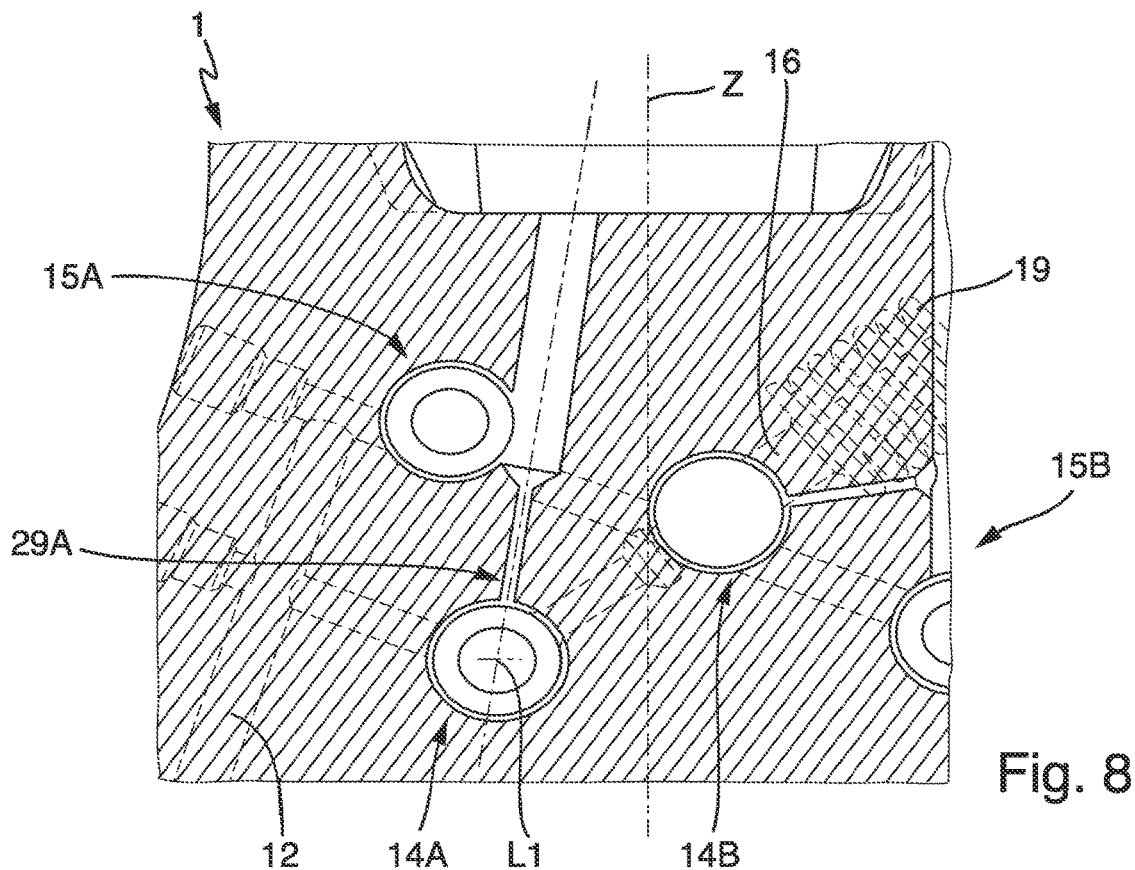

Preferably, however, as depicted in FIG. 8, which shows a detail of a longitudinal section through the inventive connecting rod from FIGS. 1 and 2 along a plane oriented perpendicular to a crankshaft axis in the area above the valve devices 14A and 14B of the length adjustment device 7 above the large connecting rod eye 3, both hydraulic ducts 11A and 11B respectively open into the associated valve recess 6A/6B such that a hydraulic duct longitudinal axis of the section adjacent the valve recess 6A/6B intersects the associated valve recess longitudinal axis. Doing so can prevent a vortex from being generated in the hydraulic medium flow.

Figure 9:
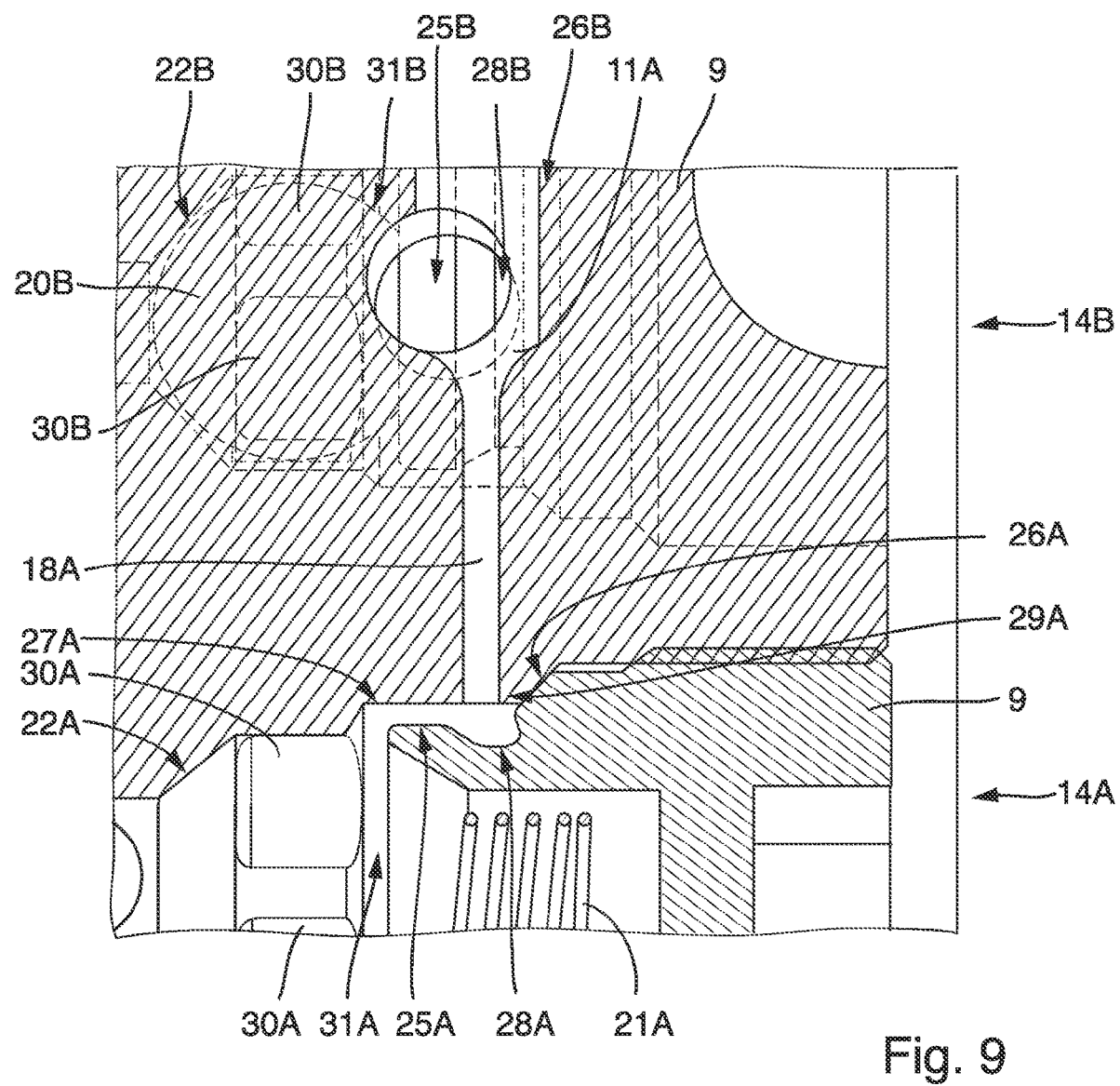

FIG. 9 shows a detail of a partial section through the inventive connecting rod from FIGS. 1 and 2 along a further sectional plane in the region of the lower control valve device 14A, wherein readily recognizable from this illustration is the control valve devices 14A and 14B, in particular the respective plug screw 9, in each case exhibiting an undercut 28A/28B in their closed outer wall section 25A/25B adjacent to a radial shoulder. These in each case enable achieving an improved hydraulic medium diversion in the direction of the valve body 20A.

Further to be recognized from FIG. 9 is that the control valve devices 14A and 14B, in particular the valve recess 6A, exhibit kidney-shaped depressions 30A and 30B in the region of the valve body 20A/20B so as to enable flow around, in particular past, the valve body 20A and 20B to the valve seat in order to prevent the valve bodies 20A and 20B from tightly suctioning onto the valve seat.

Figure 10:
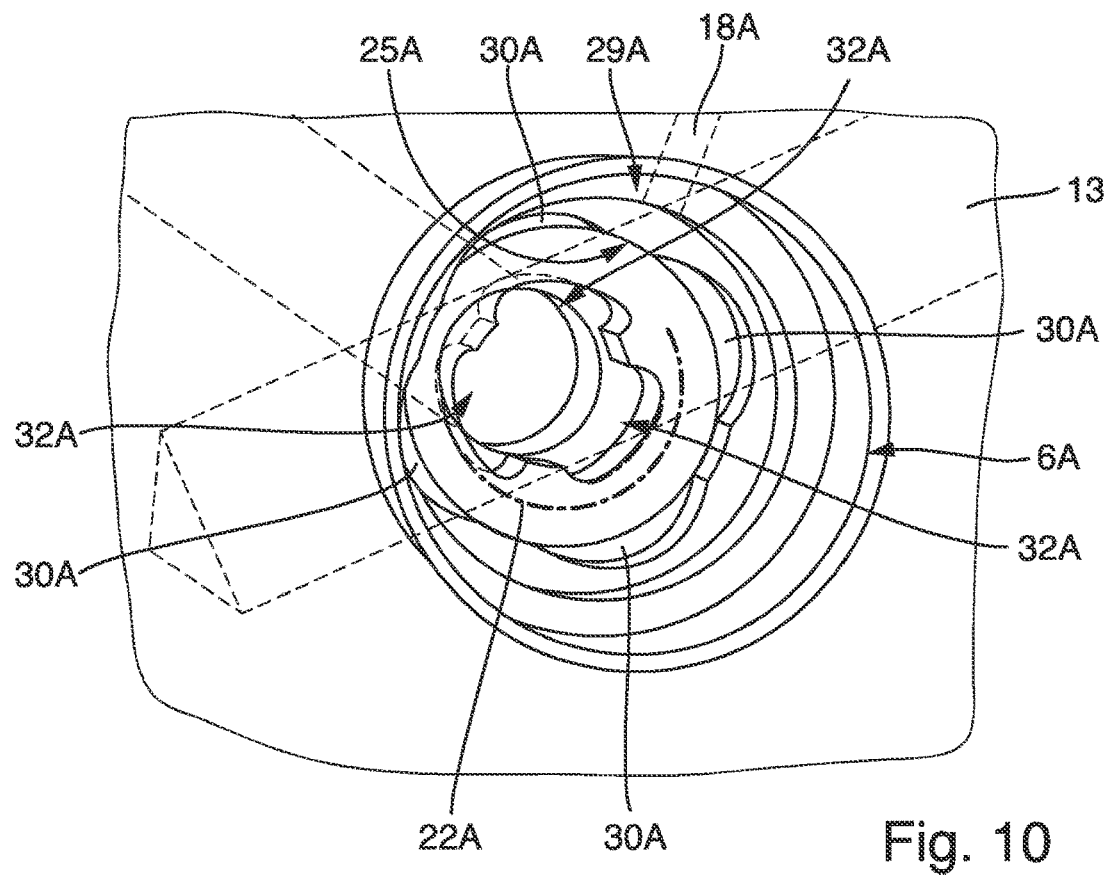

FIG. 10 shows a greatly simplified schematic representation in a substantially oblique perspective view from above onto or respectively into the valve recess 6A of the lower control valve device 14A, wherein the four kidney-shaped or respectively atom-shaped depressions 30A arranged in an even circumferential distribution are clearly visible in this view.

In addition to depressions 30A, three likewise kidney-shaped bypass through openings or respectively cavities 32A are further visible, these being arranged in the region of the actuator body (not depicted here) and likewise arranged in an even circumferential distribution. These enable an improved flow around the actuator body, in particular a larger volumetric flow of hydraulic medium when the associated hydraulic working chamber 10A is being drained.

Figure 11:
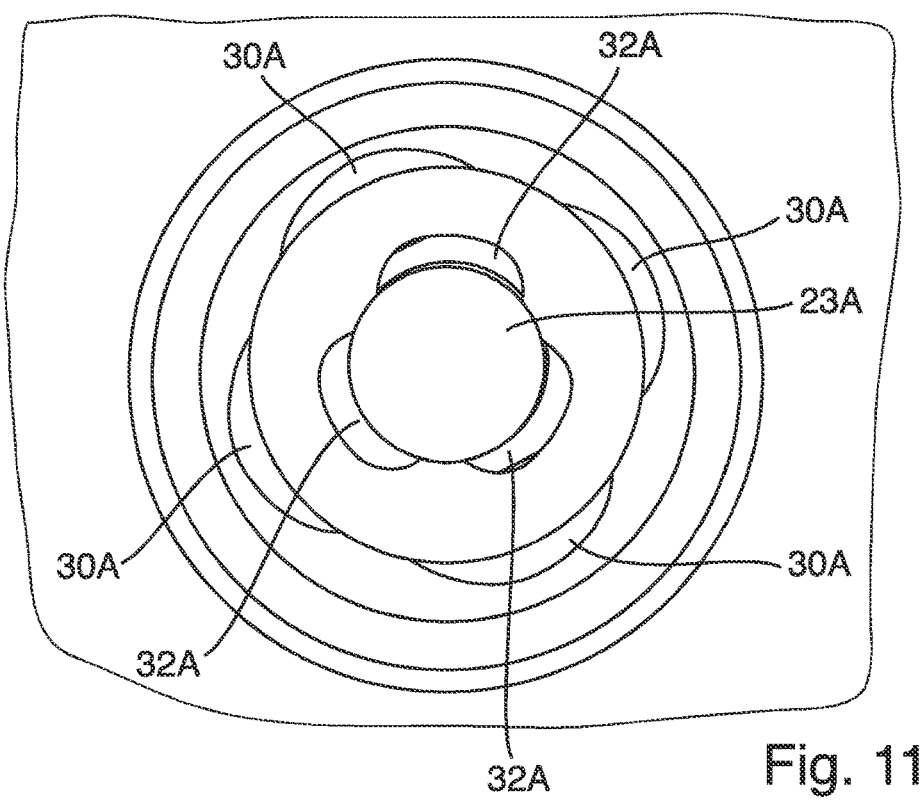

FIG. 11 again depicts the depressions 30A as well as the bypass through openings 31A in a side view with the actuator body 23A for a better understanding.

Figure 12:
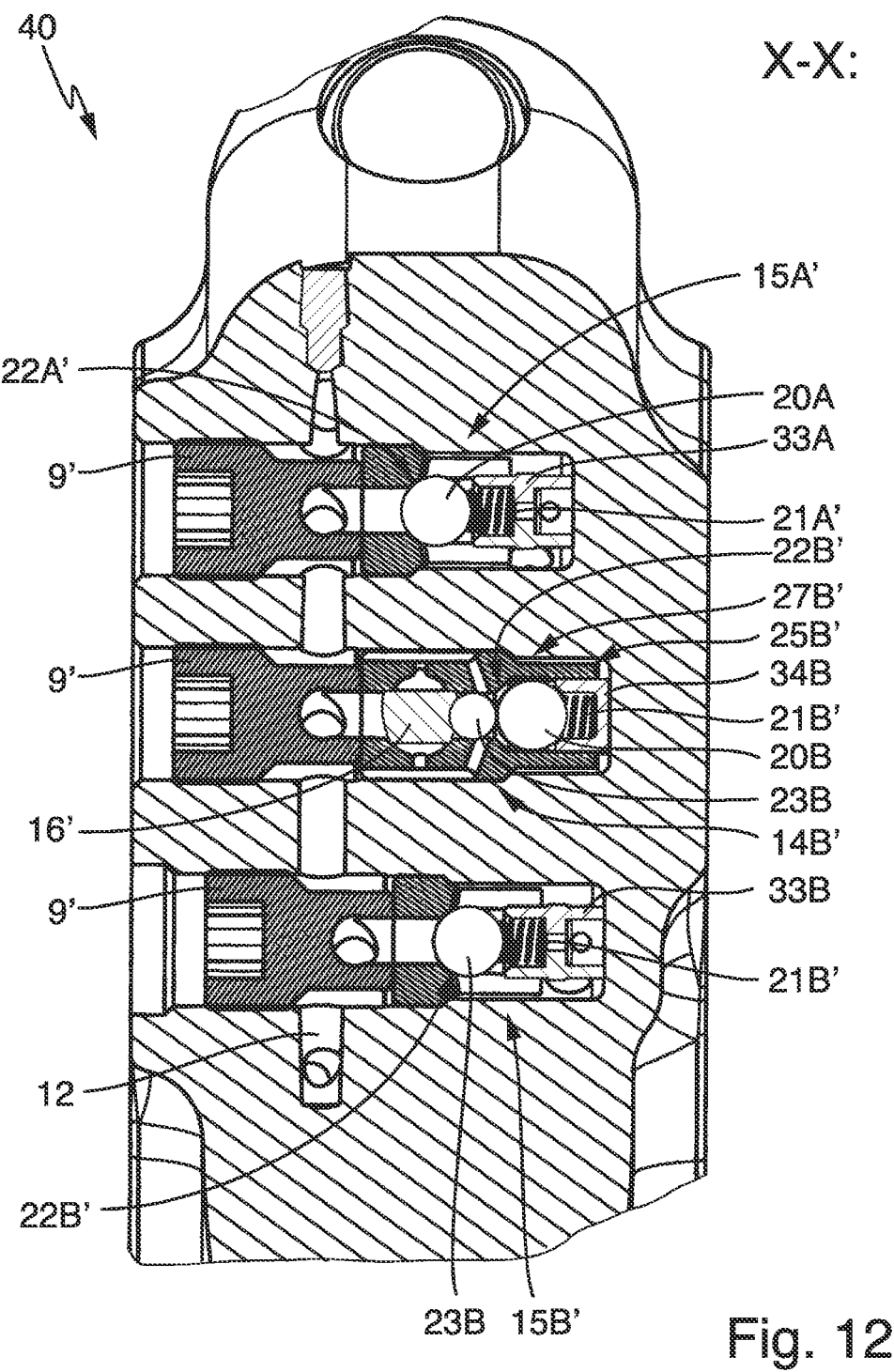
Figure 13:
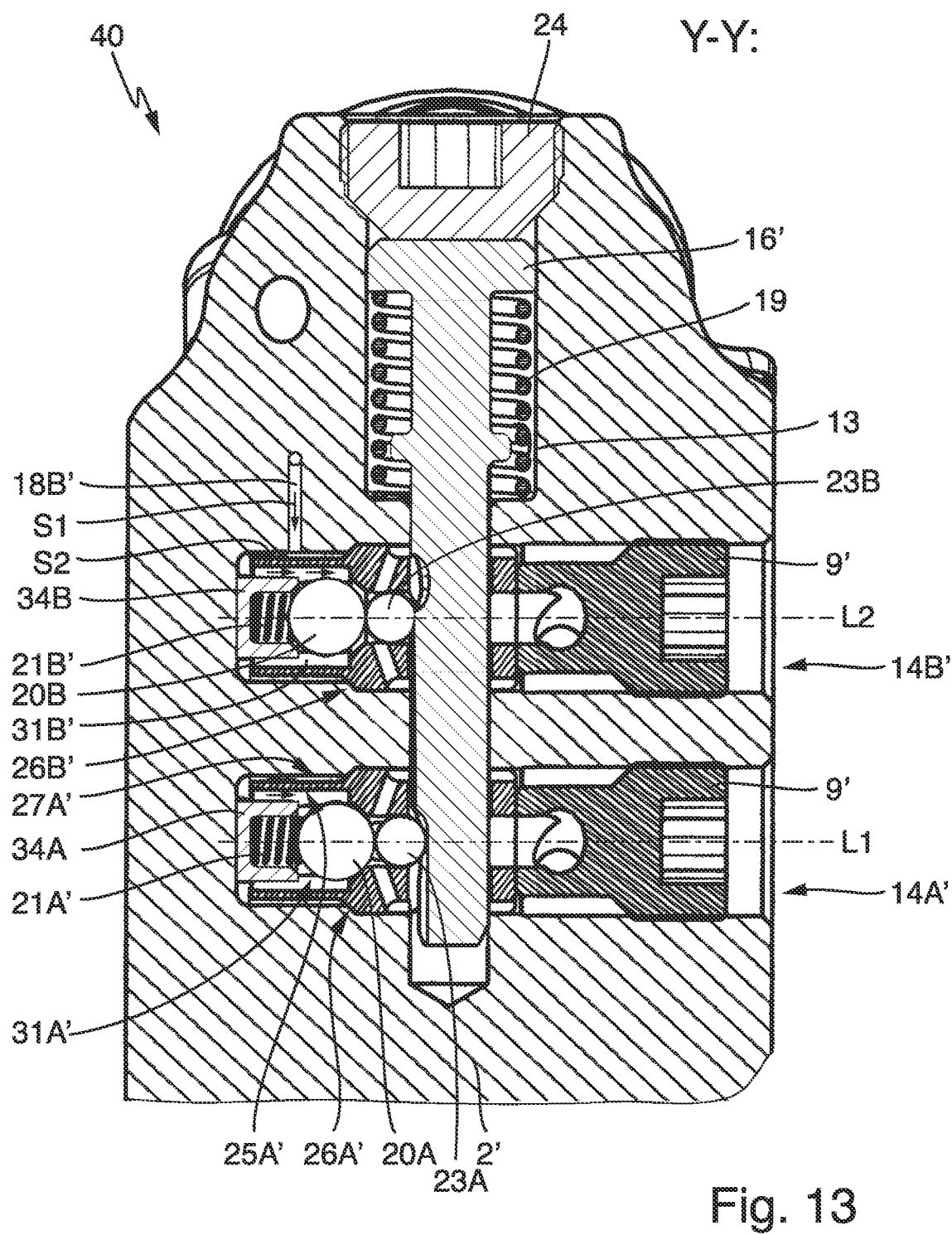

FIG. 12 shows a detail of a first section through a second exemplary embodiment of an inventive adjustable-length connecting rod 40 along a first sectional plane X-X' analogous to FIG. 1 and FIG. 13 shows a second section through the connecting rod 40 along a second sectional plane Y-Y' analogous to FIG. 1, wherein components which are of functionally equivalent yet geometrically differing design from the first exemplary embodiment are identified by way of an apostrophe.

Valve devices 14A', 14B', 15A' and 15B' thereby substantially differ from those of the above-described connecting rod 1 in that the guide unit 33A/33B/34A/34B for the valve spring 21A/21B' here is not respectively formed by the plug screw 9/9' but rather by a sleeve 33A/33B/34A/34B supported at the bottom of the associated valve recess.

A further difference is that the inventive closed outer wall section 25A/25B' of the control valve devices 14A/14B' is in each case formed by an outer wall surface 25A/25B' of a valve seat unit.

In an alternative embodiment not depicted in the figures, the hydraulic duct can also open into the valve recess such that a valve recess longitudinal axis of a last hydraulic duct section adjacent the valve recess runs parallel to, in particular coincides with, the valve recess longitudinal axis of the valve recess.

In a further possible, in particular alternative embodiment, the flow duct can also be configured to divert the hydraulic medium in a second direction of flow running perpendicular to the valve recess longitudinal axis of the valve recess.

In a further possible, in particular alternative embodiment, the outer section of the valve device of closed configuration, which at least partially surrounds the valve chamber of the valve device, can at least partially extend, with regard to the valve recess longitudinal axis of the valve recess, in a plane perpendicular to the valve recess longitudinal axis of the valve recess.

The above-described measures for preventing damage to components of a valve device of a length adjustment device of a hydraulic adjustable-length connecting rod are thereby not only suitable for just length adjustment devices arranged within a connecting rod shank and enabling telescopic length adjustment, as described in the exemplary embodiments, but rather can in principle also be used, particularly given the incorporation of any appropriately relevant, in particular trivial adaptations, in adjustable-length connecting rods designed for example as described in DE 10 2012 020 999 A1.

Furthermore, a multitude of modifications, in particular constructive modifications, are possible without departing from the content of the claims.

LIST OF REFERENCE NUMERALS 1, 40 adjustable-length connecting rod
2, 2' first connecting rod part
3 large connecting rod eye
4 second connecting rod part
5 small connecting rod eye
6A, 6B control valve recess
7 length adjustment device
8A, 8B check valve recess
9, 9', 24 securing means
10 guide cylinder/hydraulic cylinder
10A first hydraulic working chamber
10B second hydraulic working chamber
11A, 11B hydraulic duct
12 hydraulic medium supply line
13 actuation recess
14A, 14B control valve device
14A',14B'
15A, 15B check valve device
15A',15B'
16, 16' actuating means
17 hydraulic piston connected to second connecting rod part
18A, 18B throttle
18B'
19 spring element
20A, 20B valve body
21A, 21B valve spring
21A', 21B'
22A, 22B valve seat
22A', 22B'
23A, 23B actuator body
25A, 25B closed outer wall section
25A', 25B'
26A, 26B sealing surface
26A', 26B'
27A, 27B inner wall section
27A', 27B'
28A, 28B undercut
29A, 29B orifice opening
30A, 30B depression
31A, 31B valve chamber
32A, 32B bypass through opening
33A, 33B spring guide element
34A, 34B
L effective connecting rod length
Z connecting rod longitudinal axis
L1, L2 control valve longitudinal axis
S1 first direction of flow
S2 second direction of flow
α confluence angle

What is claimed is:

1. An adjustable-length connecting rod for a reciprocating piston engine, particularly for a reciprocating internal combustion engine, wherein an effective connecting rod length of the connecting rod can be changed, wherein the connecting rod comprises a hydraulic length adjustment device for changing the effective connecting rod length which comprises:

at least one hydraulic working chamber;
at least one hydraulic duct for discharging hydraulic medium from the hydraulic working chamber;
at least one valve recess having a valve recess longitudinal axis; and
a valve device comprising a valve chamber arranged in the valve recess,
wherein the valve device comprises a valve body arranged in the valve chamber able to be lifted from a valve seat along a valve lift axis for opening the valve device against a restoring force,
wherein the valve device comprises a securing means, by means of which parts of the valve device or the entire valve device are secured against falling out of the valve recess,
wherein the valve device is designed to open and/or block a hydraulic medium outflow from the hydraulic working chamber,
wherein the valve device is arranged with the valve lift axis parallel to the valve recess longitudinal axis of the valve recess,
wherein the hydraulic duct is arranged in a flow path between the valve device and the hydraulic working chamber and opens at a first end into the valve recess at an orifice opening in an inner wall section of the valve recess,
wherein the valve device comprises at least one outer wall section opposite the orifice opening which is of closed configuration in at least one region opposite from the orifice opening and at least partially surrounds the valve chamber of the valve device,
wherein the outer wall section of the valve device of closed configuration at least partially surrounds the valve chamber in the region of the valve body and/or the valve spring and forms a flow duct together with the inner wall section of the valve recess surrounding the orifice opening, wherein the flow duct is configured to at least partially divert hydraulic medium exiting the hydraulic duct and entering the valve recess in a first direction of flow into a second direction of flow differing from the first direction of flow prior to the entry into the valve chamber of the valve device, wherein the flow duct is of closed configuration on a first side and open on an oppositely disposed second side, wherein the flow duct is fluidly connected to the valve chamber, wherein the closed outer wall section is formed by an outer surface of a cylindrical section of the securing means of the valve device and extends as far as a sealing surface, whereby the flow duct is axially closed on a first side and hydraulic medium is conducted toward the valve body and past same into the valve chamber at a reduced flow velocity.

2. The adjustable-length connecting rod according to claim 1, wherein the flow duct is configured to divert the hydraulic medium in a second direction of flow running parallel to the valve recess longitudinal axis of the valve recess.

3. The adjustable-length connecting rod according to claim 1, wherein the flow duct is further configured to reduce a flow velocity of a hydraulic medium exiting the hydraulic duct and entering the valve recess prior to the entry into the valve chamber of the valve device.

4. The adjustable-length connecting rod according to claim 1, wherein a throttle is arranged in a hydraulic duct section adjacent to the valve recess or said hydraulic duct section is designed as a throttle.

5. The adjustable-length connecting rod according to claim 1, wherein the hydraulic duct opens into the valve recess via a circumferential wall of the valve recess, preferably at an angle of at least 30°, 45°, 60°, 70°, 80° or 85° to the valve recess longitudinal axis of the valve recess, in particular, however, at an angle of no more than 90° and thus perpendicular to the valve recess longitudinal axis of the valve recess.

6. The adjustable-length connecting rod according to claim 1, wherein the hydraulic duct opens into the valve recess such that a hydraulic duct longitudinal axis of the hydraulic duct section adjacent the valve recess intersects the valve recess longitudinal axis of the valve recess, wherein the hydraulic duct longitudinal axis of the hydraulic duct section adjacent the valve recess in particular lies in a common longitudinal median plane of the valve recess with the valve recess longitudinal axis.

7. The adjustable-length connecting rod according to claim 1, wherein the outer section of the valve device of closed configuration which at least partially surrounds the valve chamber, at least partially surrounds the valve chamber in the circumferential direction with regard to the valve recess longitudinal axis of the valve recess.

8. The adjustable-length connecting rod according to claim 1, wherein the flow duct is an annulus segment which, with regard to the valve recess longitudinal axis of the valve recess, extends at least partially in the axial direction and at least partially in the circumferential direction or an annular space extending at least partially in the axial direction and over the entire circumference.

9. The adjustable-length connecting rod according to claim 1, wherein the flow duct is fluidly connected to the valve chamber via the second side.

10. The adjustable-length connecting rod according to claim 1, wherein the outer wall section of closed configuration, which together with the inner wall section of the valve recess surrounding the orifice opening forms the flow duct, comprises a groove and/or a bezel, in particular a groove and/or bezel extending at least partially in the circumferential direction, particularly an undercut adjoining a collar or a radially extending shoulder.

11. The adjustable-length connecting rod according to claim 1, wherein the valve body is able to be lifted from the valve seat along the valve lift axis for opening the valve device against a restoring force of a valve spring.

12. The adjustable-length connecting rod according to claim 11, wherein the valve device comprises a valve seat unit comprising a valve seat, wherein the outer wall section of closed configuration, which together with the inner wall section of the valve recess surrounding the orifice opening forms the flow duct, is formed by an outer wall section of the valve seat unit.

13. The adjustable-length connecting rod according to claim 11, wherein the valve device comprises a spring guide unit for axially supporting and/or guiding the valve spring, wherein the outer wall section of closed configuration, which together with the inner wall section of the valve recess surrounding the orifice opening forms the flow duct, is formed by an outer wall section of the spring guide unit.

14. The adjustable-length connecting rod according to claim 11, wherein the securing means is a plug screw, wherein the securing means is designed for the axial support and/or guidance of the valve spring.

15. The adjustable-length connecting rod according to claim 11, wherein an inner wall section adjacent the valve seat of the valve body and/or at least partially surrounding the valve body in the region of the valve seat in the form of a jacket comprises at least one depression extending at least over one defined region in the circumferential direction and at least radially outwardly and axially, preferably at least one depression of semicircular, semi-elliptical, kidney-shaped or atom-shaped radial cross section, in particular a plurality of such depressions arranged in even circumferential distribution.

16. The adjustable-length connecting rod according to claim 1, wherein the valve device is an actuatable control valve device, in particular a control valve device able to be actuated via a rod-like, axially displaceable actuating element, wherein in a first actuating position of the rod-like actuating element, the valve body of the control valve device is lifted from the valve seat and a hydraulic medium outflow via the hydraulic duct is opened from the hydraulic chamber into the valve recess and through the valve chamber, and in a second actuating position of the actuating element, the valve body of the control valve device rests against the valve seat and a hydraulic medium outflow from the hydraulic chamber into the valve recess and through the valve chamber via the hydraulic duct is blocked.

17. The adjustable-length connecting rod according to claim 16, wherein the control valve device further comprises an actuator body which is arranged between the valve body and the rod-like actuating element, and in particular serves in mechanically transmitting actuation of the actuating element to the valve body.

18. The adjustable-length connecting rod according to claim 17, wherein an inner wall section adjacent to a valve seat of the actuator body and/or at least partially surrounding the actuator body in the region of the associated valve seat in the form of a jacket comprises at least one bypass through opening extending at least over one defined region in the circumferential direction and at least radially outwardly and axially, preferably at least one bypass through opening of semicircular, semi-elliptical, kidney-shaped or atom-shaped radial cross section, in particular a plurality of such bypass through openings arranged in even circumferential distribution.

19. A reciprocating piston engine, in particular a reciprocating internal combustion engine, having an adjustable-length connecting rod according to claim 1.

20. An adjustable-length connecting rod for a reciprocating piston engine, particularly for a reciprocating internal combustion engine, wherein an effective connecting rod length of the connecting rod can be changed, wherein the connecting rod comprises a hydraulic length adjustment device for changing the effective connecting rod length which comprises:
- at least one hydraulic working chamber;
- at least one hydraulic duct for discharging hydraulic medium from the hydraulic working chamber;
- at least one valve recess having a valve recess longitudinal axis; and
- a valve device comprising a valve chamber arranged in the valve recess,
- wherein the valve device comprises a valve body arranged in the valve chamber able to be lifted from a valve seat along a valve lift axis for opening the valve device against a restoring force,
- wherein the valve device comprises a securing means, by means of which parts of the valve device or the entire valve device are secured against falling out of the valve recess,
- wherein the valve device is designed to open and/or block a hydraulic medium outflow from the hydraulic working chamber,
- wherein the hydraulic duct is arranged in a flow path between the valve device and the hydraulic working chamber and opens at a first end into the valve recess at an orifice opening in an inner wall section of the valve recess,
- wherein the valve device comprises at least one outer wall section opposite the orifice opening which is of closed configuration in at least one region opposite from the orifice opening and at least partially surrounds the valve chamber of the valve device,
- wherein the outer wall section of the valve device of closed configuration at least partially surrounds the valve chamber in the region of the valve body and/or the valve spring and forms a flow duct together with the inner wall section of the valve recess surrounding the orifice opening, wherein the flow duct is configured to at least partially divert hydraulic medium exiting the hydraulic duct and entering the valve recess in a first direction of flow into a second direction of flow differing from the first direction of flow prior to the entry into the valve chamber of the valve device,
- wherein the flow duct is of closed configuration on a first side and open on an oppositely disposed second side, wherein the flow duct is fluidly connected to the valve chamber, and
- wherein the closed outer wall section is formed by an outer surface of a cylindrical section of the securing means of the valve device and extends as far as a sealing surface, whereby the flow duct is axially closed on a first side and hydraulic medium is conducted toward the valve body and past same into the valve chamber at a reduced flow velocity.

* * * * *